United States Patent [19]
Furuta

[11] Patent Number: 5,956,178
[45] Date of Patent: Sep. 21, 1999

[54] KEPLERIAN VARIABLE MAGNIFICATION VIEWFINDER

[75] Inventor: Akiko Furuta, Matsudo, Japan

[73] Assignee: Nikon Corporation, Tokyo, Japan

[21] Appl. No.: 08/922,233

[22] Filed: Sep. 2, 1997

[30] Foreign Application Priority Data

Sep. 2, 1996 [JP] Japan ..................................... 8-252306
Sep. 26, 1996 [JP] Japan ..................................... 8-275443

[51] Int. Cl.⁶ ............................. G03B 13/06; G02B 15/14
[52] U.S. Cl. ......................... 359/432; 359/431; 359/686
[58] Field of Search ........................... 359/362, 420–423, 359/431–433, 676–678, 686, 689; 396/373–386

[56] References Cited

U.S. PATENT DOCUMENTS

| | | | |
|---|---|---|---|
| 5,061,054 | 10/1991 | Ohshita | 359/399 |
| 5,144,480 | 9/1992 | Ohshita | 359/432 |
| 5,173,806 | 12/1992 | Ogata | 359/683 |
| 5,193,030 | 3/1993 | Nozaki et al. | 396/379 |
| 5,220,458 | 6/1993 | Ohshita | 359/689 |
| 5,323,264 | 6/1994 | Kato | 359/432 |
| 5,381,265 | 1/1995 | Ohshita | 359/422 |
| 5,570,229 | 10/1996 | Kanamori | 359/431 |
| 5,701,199 | 12/1997 | Takato | 359/432 |

FOREIGN PATENT DOCUMENTS

| | | |
|---|---|---|
| 3-233420 | 10/1991 | Japan . |
| 4-51108 | 2/1992 | Japan ..................................... 359/432 |
| 6-18780 | 1/1994 | Japan . |
| 6-82694 | 3/1994 | Japan . |
| 6-242377 | 9/1994 | Japan . |

*Primary Examiner*—Thong Nguyen
*Attorney, Agent, or Firm*—Klarquist Sparkman Campbell Leigh & Whinston, LLP

[57] ABSTRACT

Compact, low-cost keplerian variable-magnification viewfinders are disclosed that have a zoom ratio of at least 2 and simple composition that favorably corrects all aberrations. The viewfinders are useful for use with various types of cameras, and comprise a positive objective lens system and a positive ocular lens system. The objective lens system comprises, from the object side, first, second, and third lens groups preferably comprising a single negative lens, a single positive lens, and a single negative lens, respectively. Two of the first, second, and third lens groups are axially movable for adjusting the magnification of the viewfinder. The objective lens system preferably includes a fourth lens group preferably comprising a single positive lens. The ocular lens system preferably comprises at least a positive lens and a reflector array for producing an erect image. Several groups of embodiments satisfy respective conditional expressions.

21 Claims, 33 Drawing Sheets

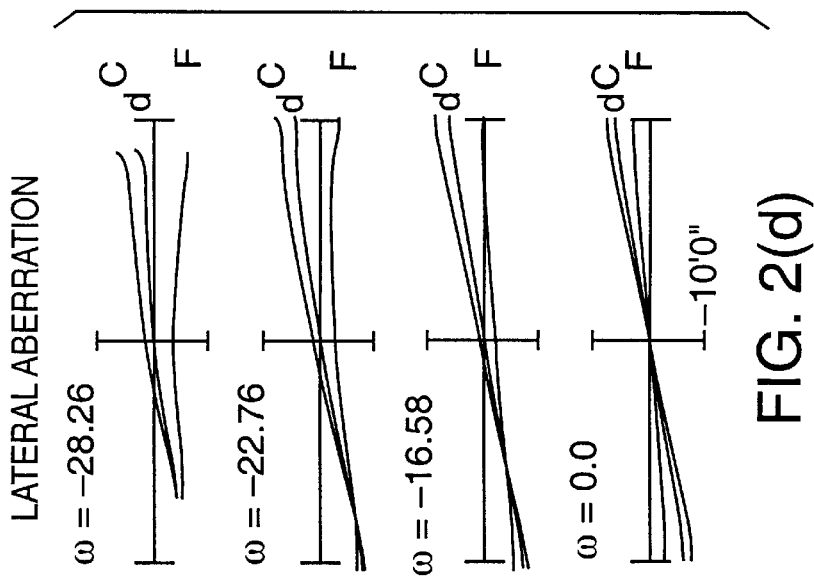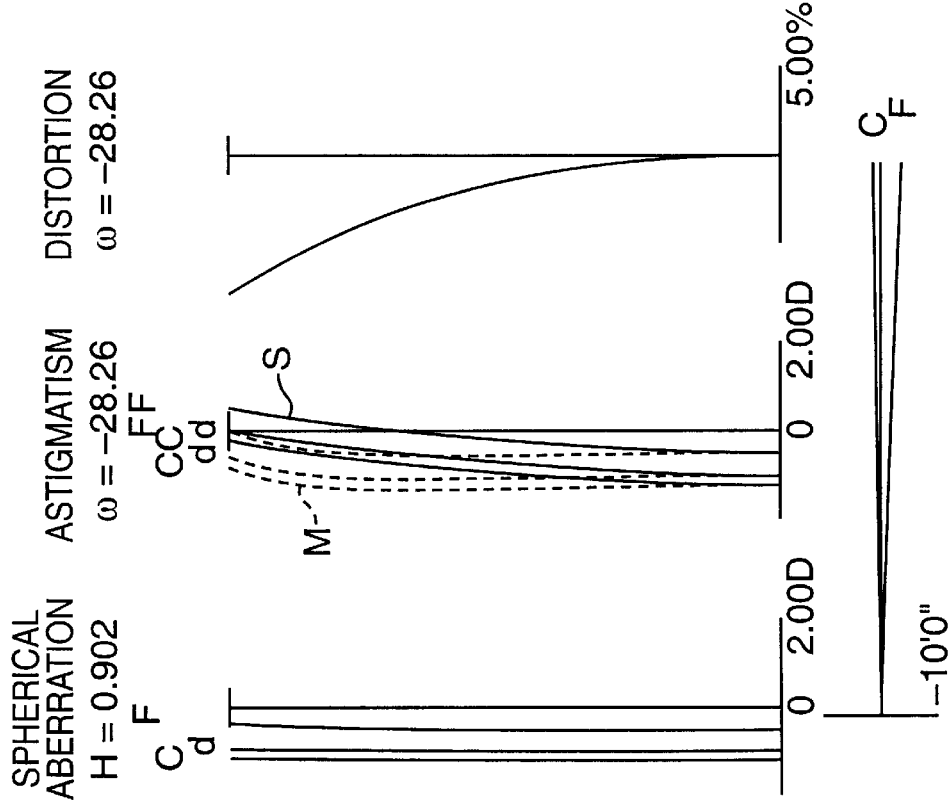

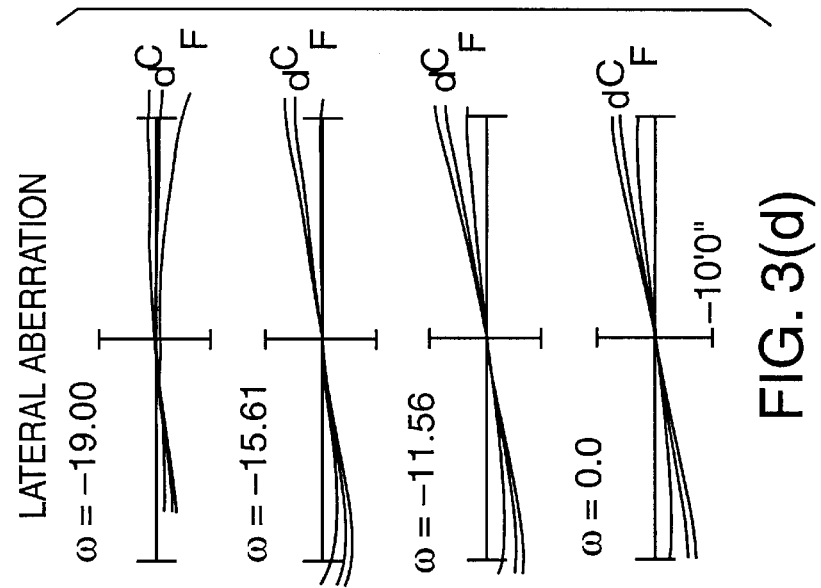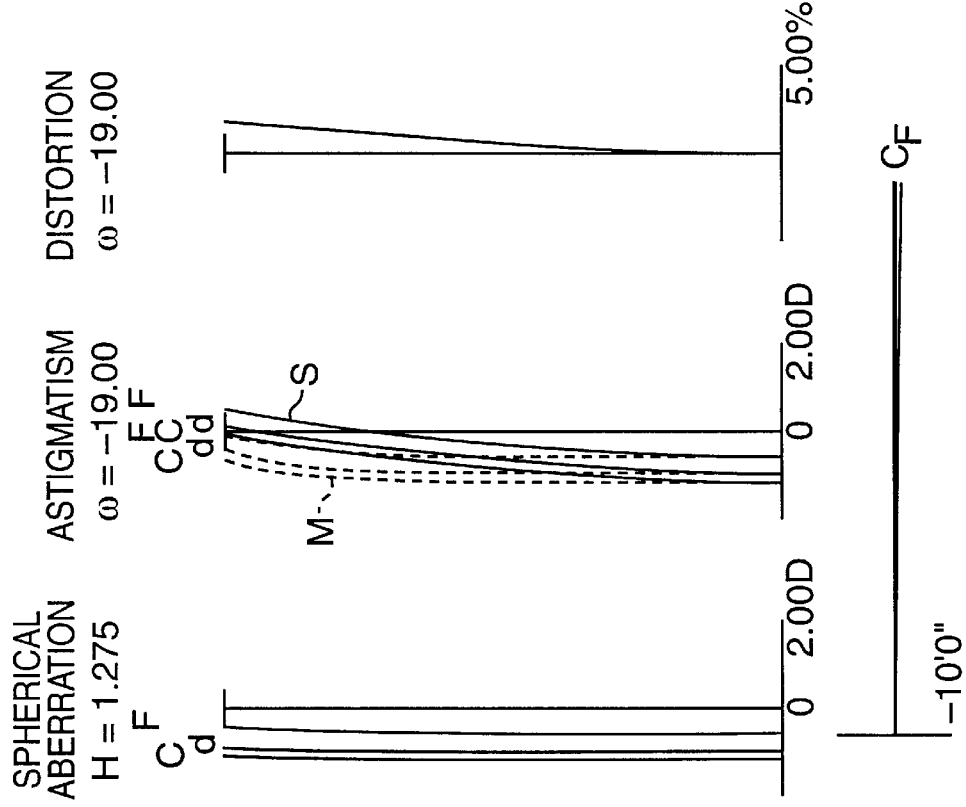

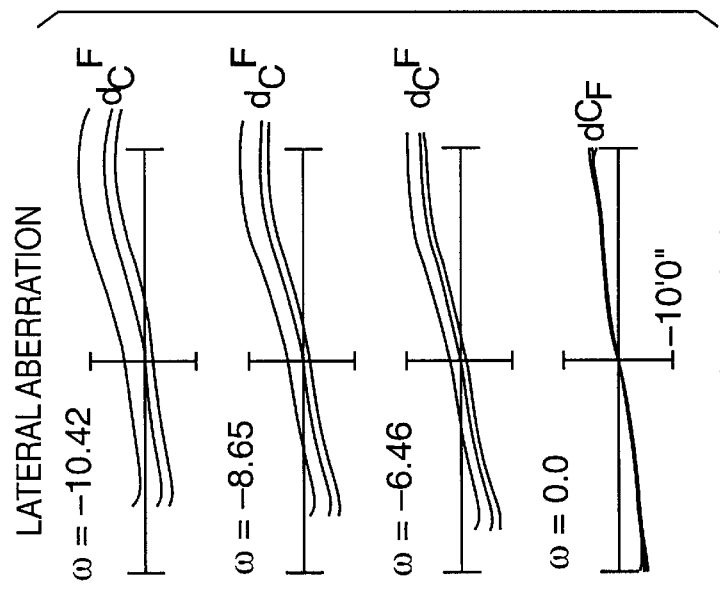
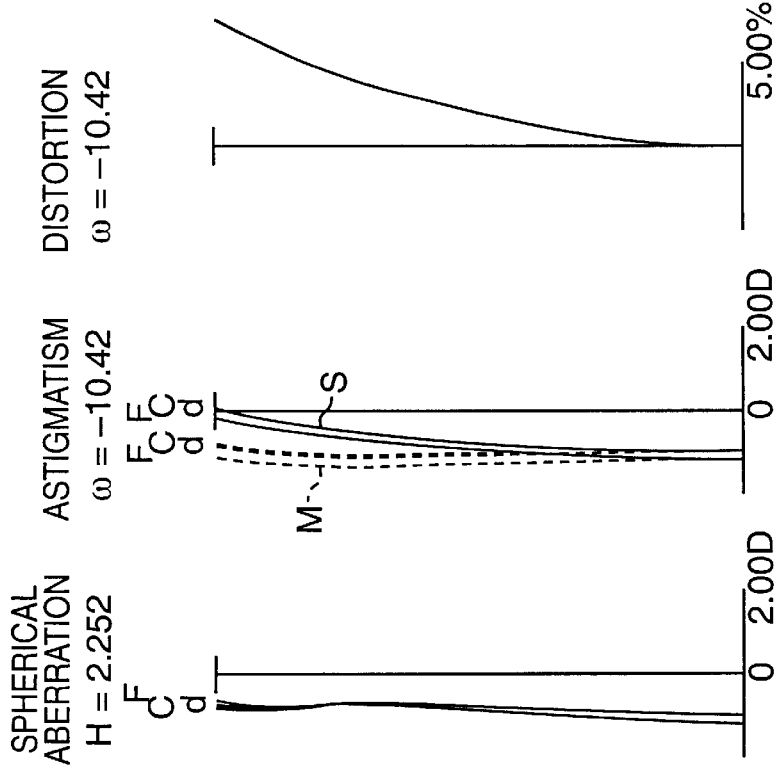

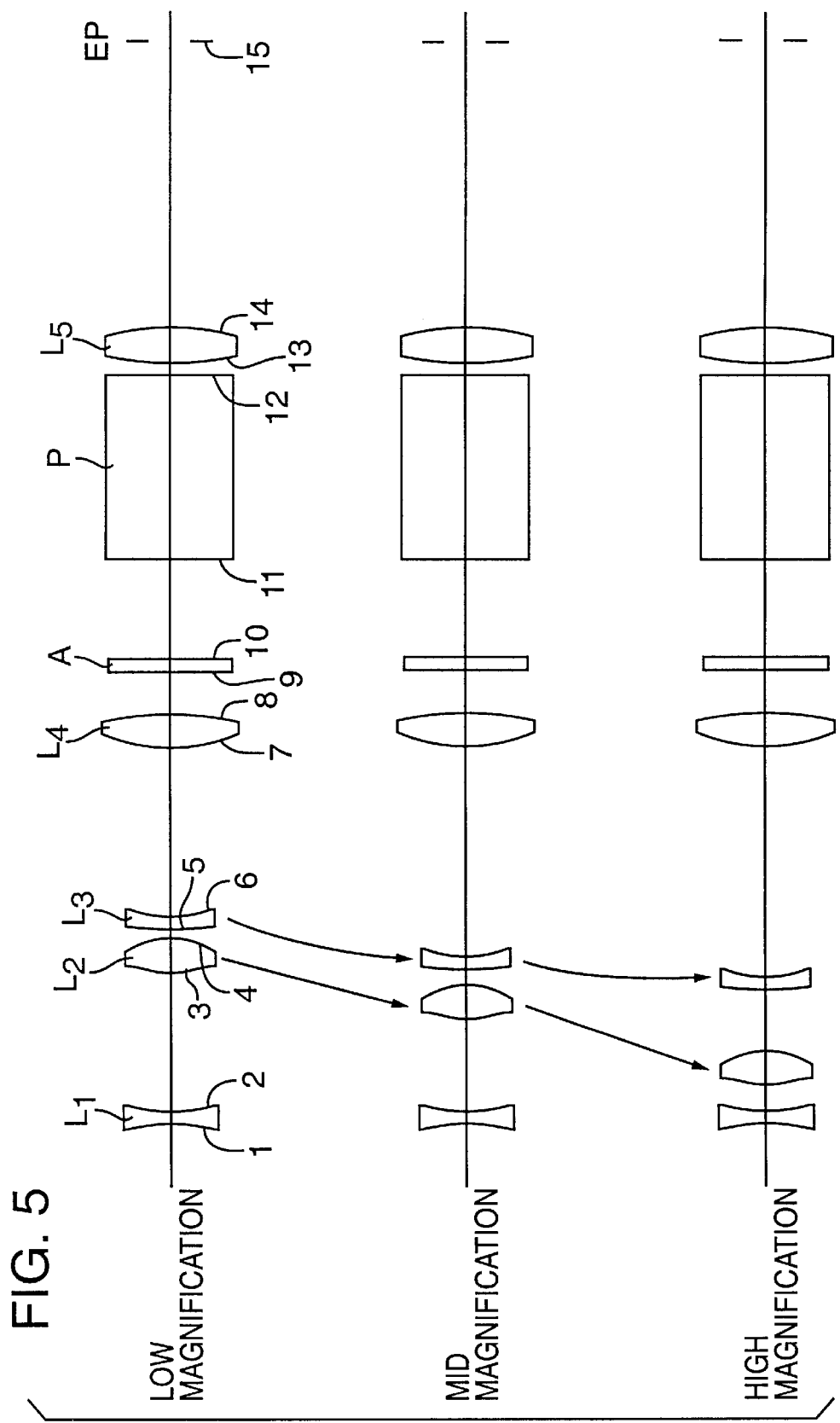

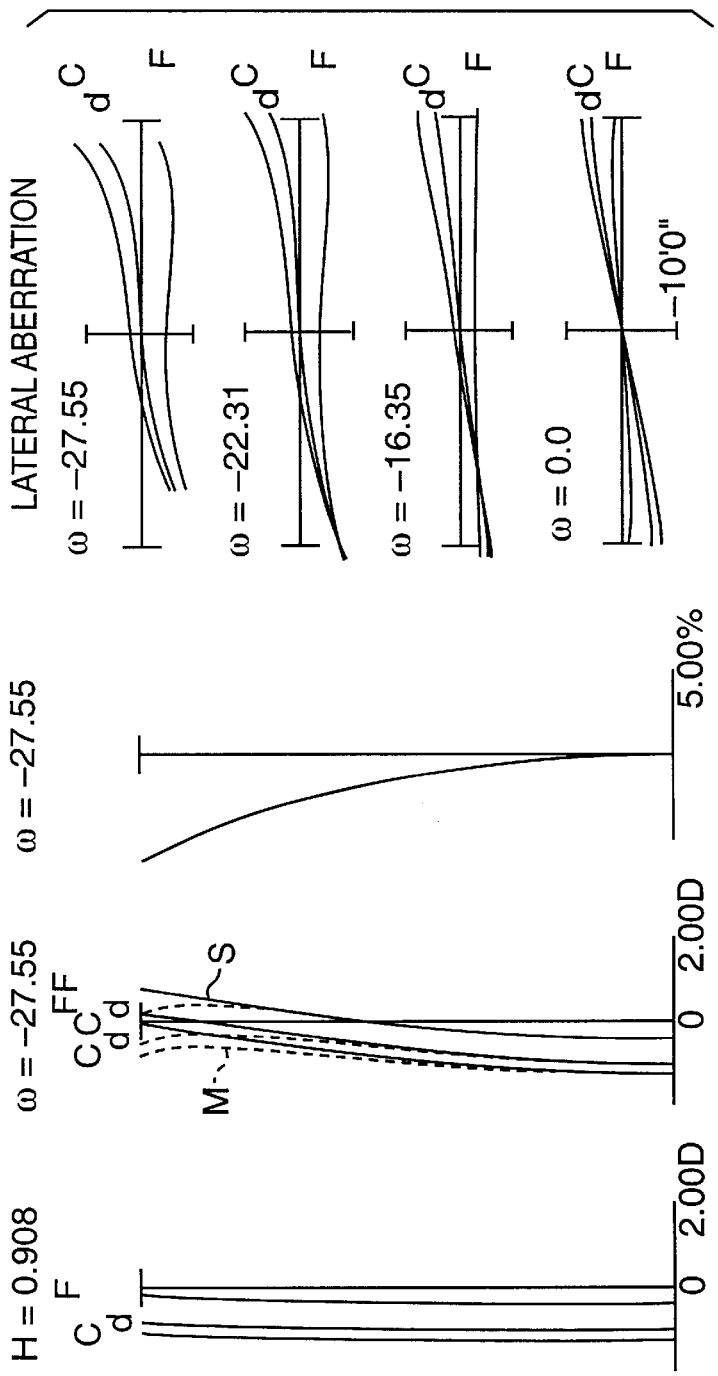

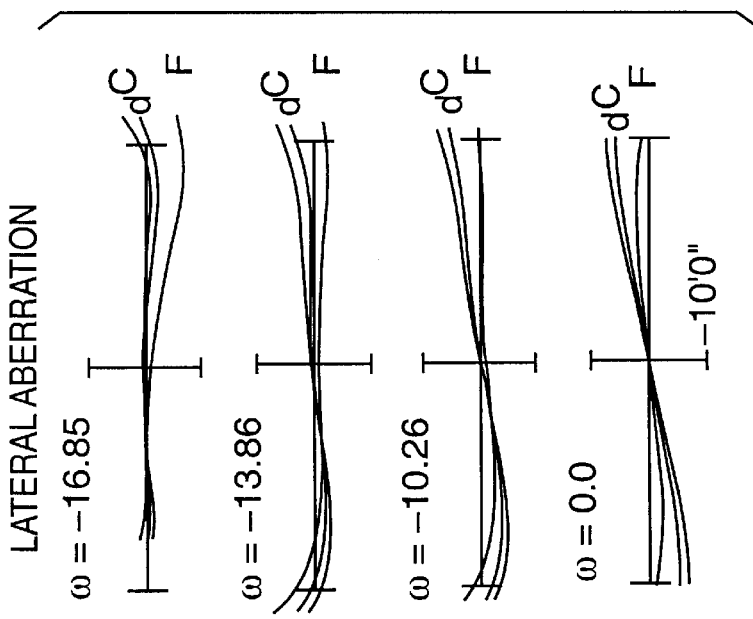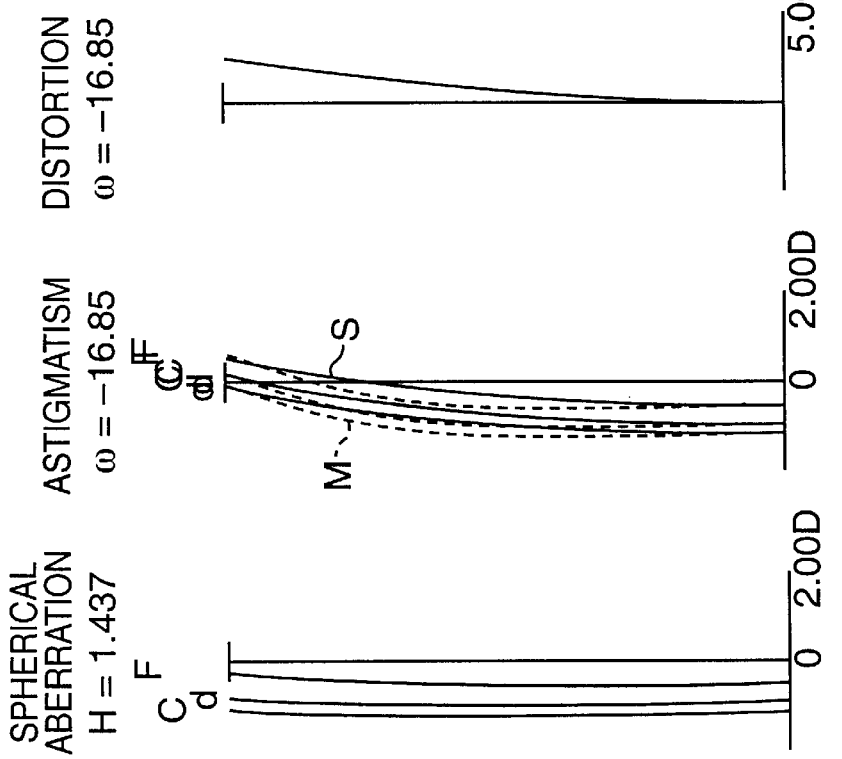

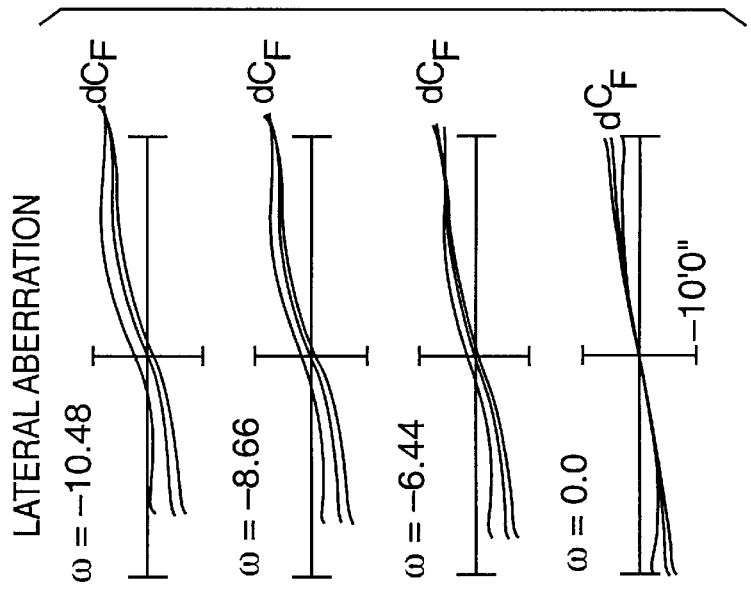
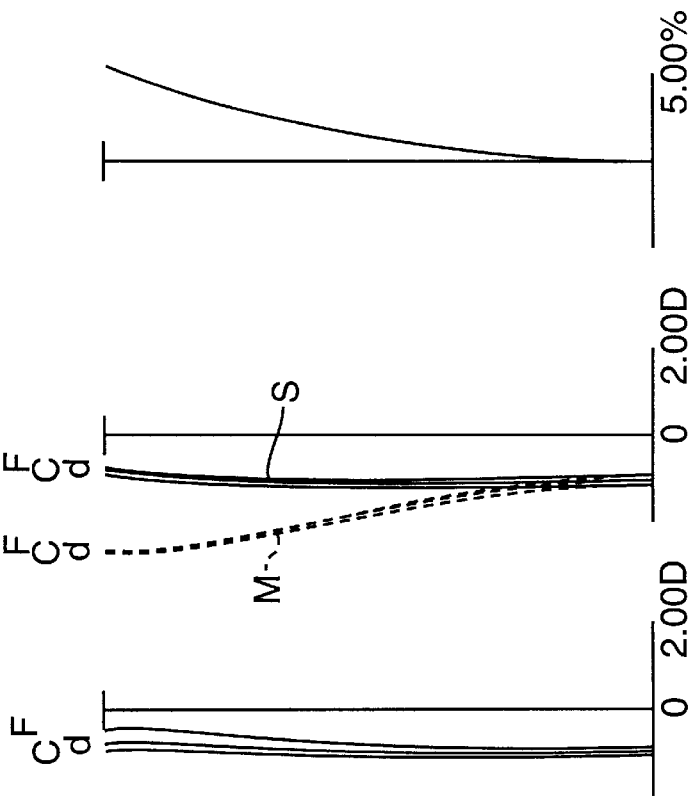
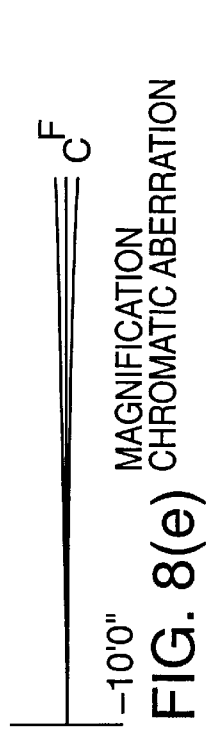
FIG. 8(a) SPHERICAL ABERRATION
FIG. 8(b) ASTIGMATISM
FIG. 8(c) DISTORTION
FIG. 8(d) LATERAL ABERRATION
FIG. 8(e) MAGNIFICATION CHROMATIC ABERRATION

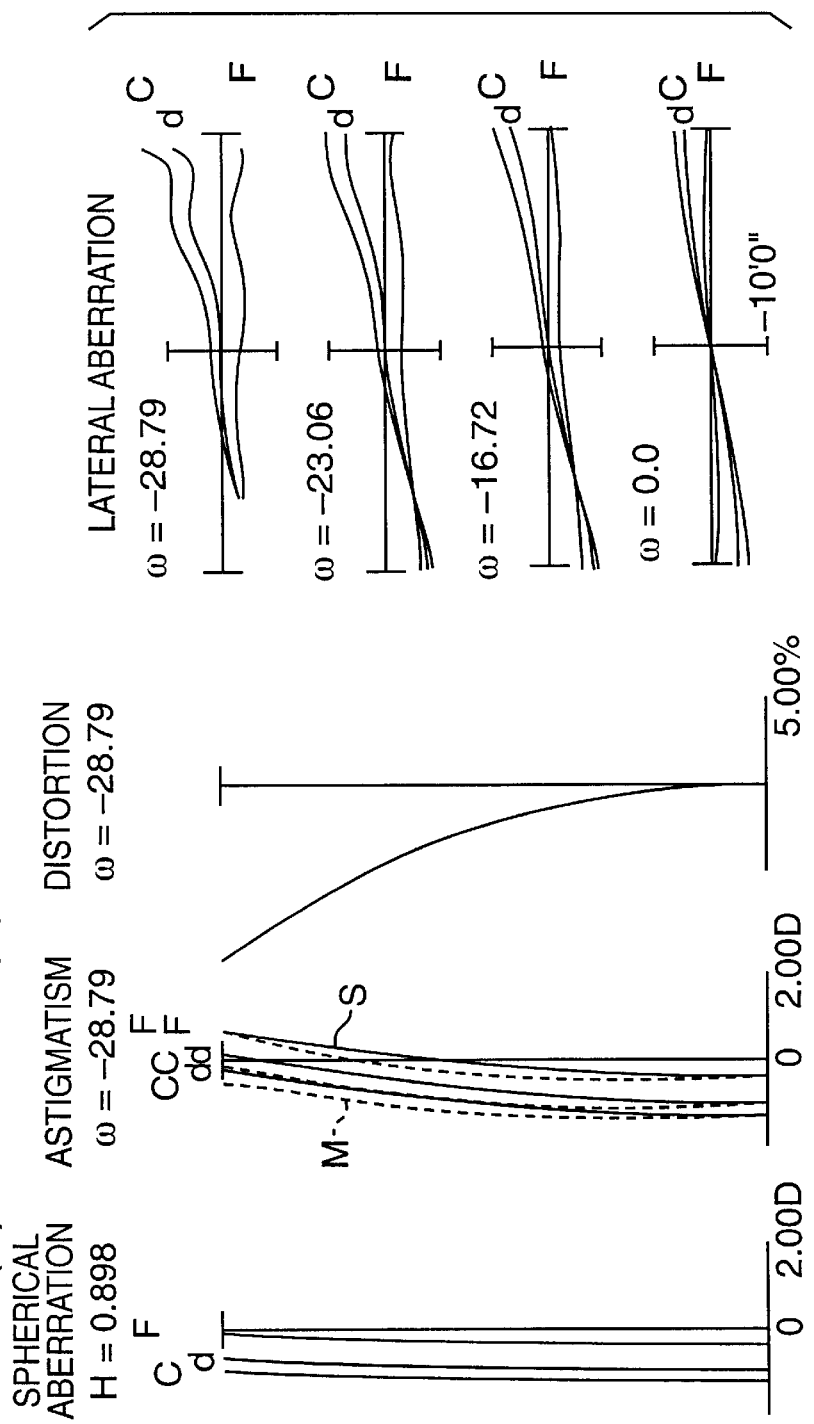

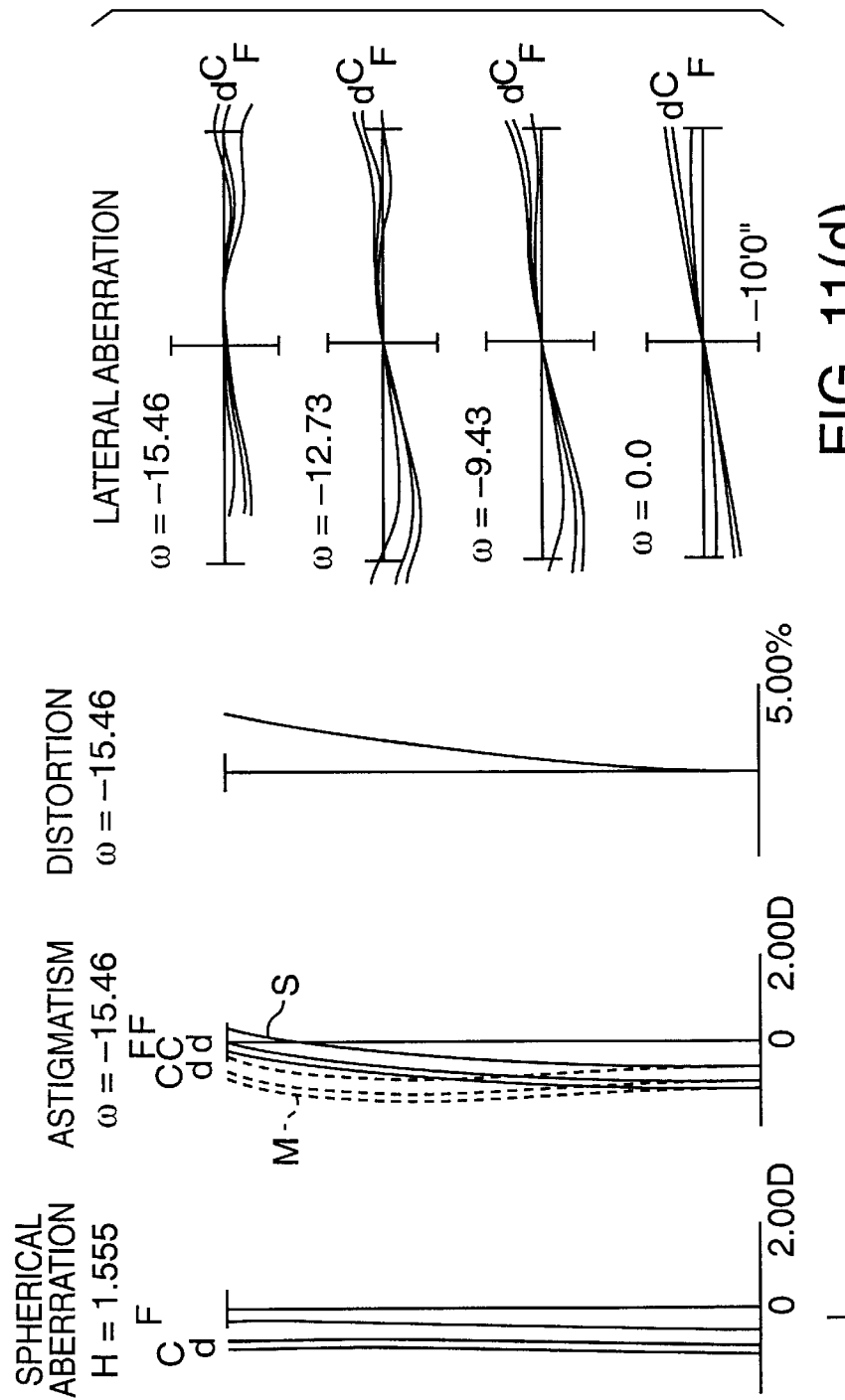

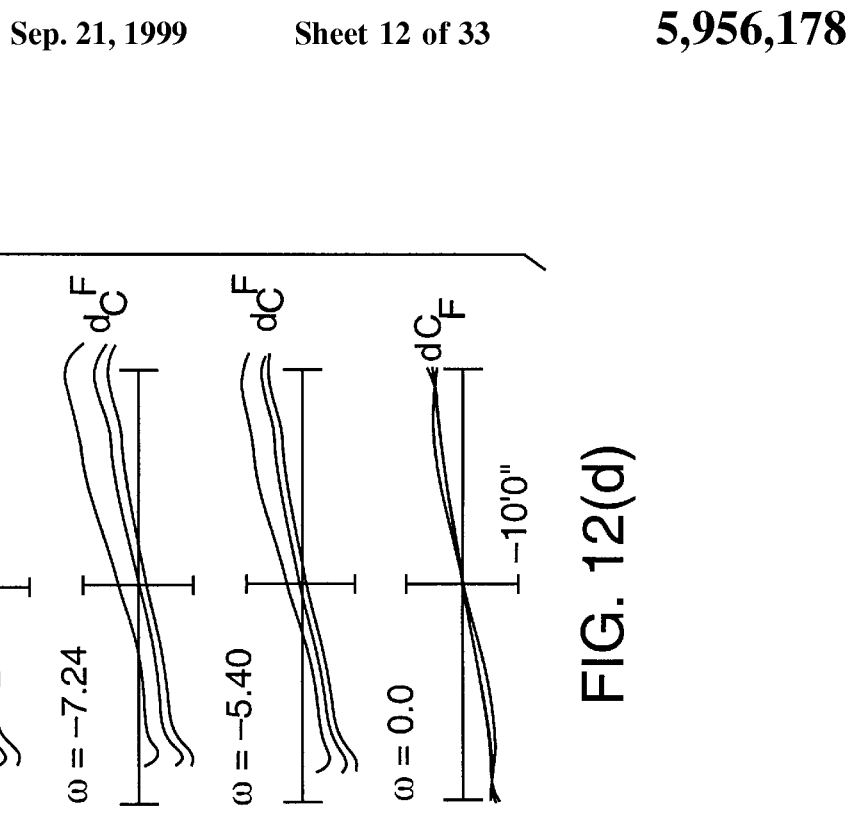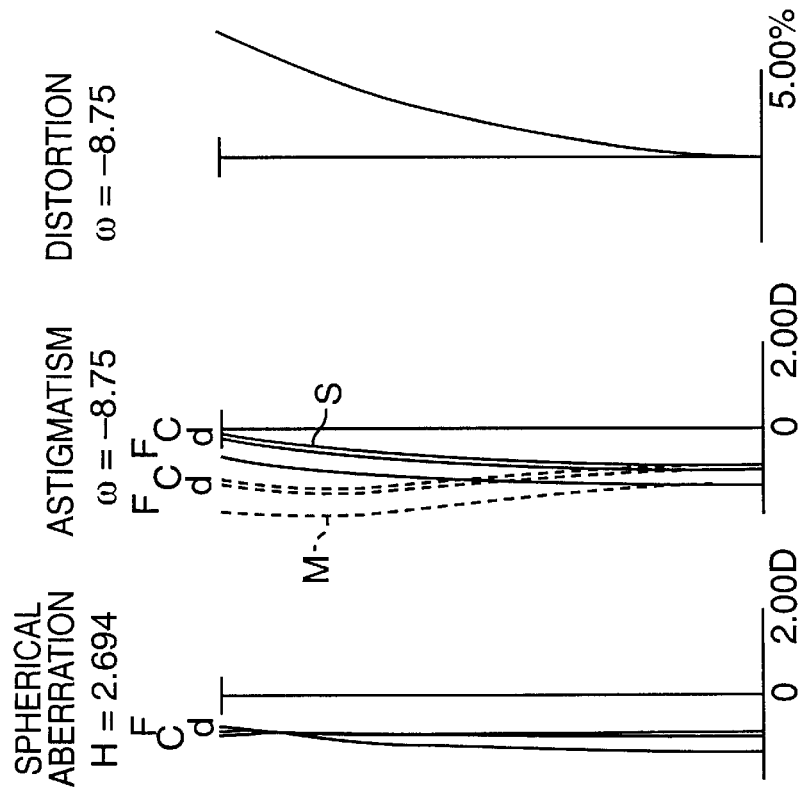

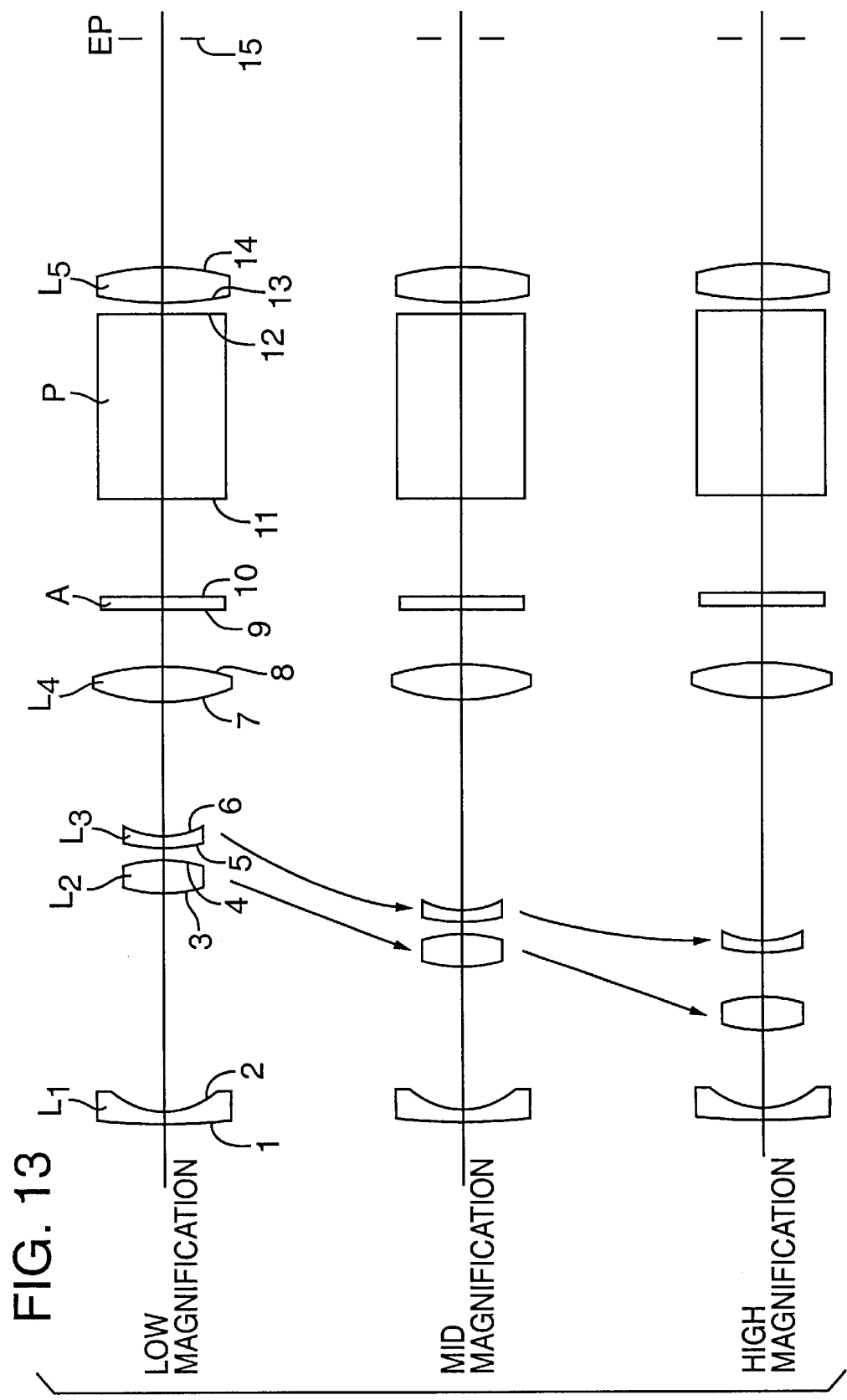

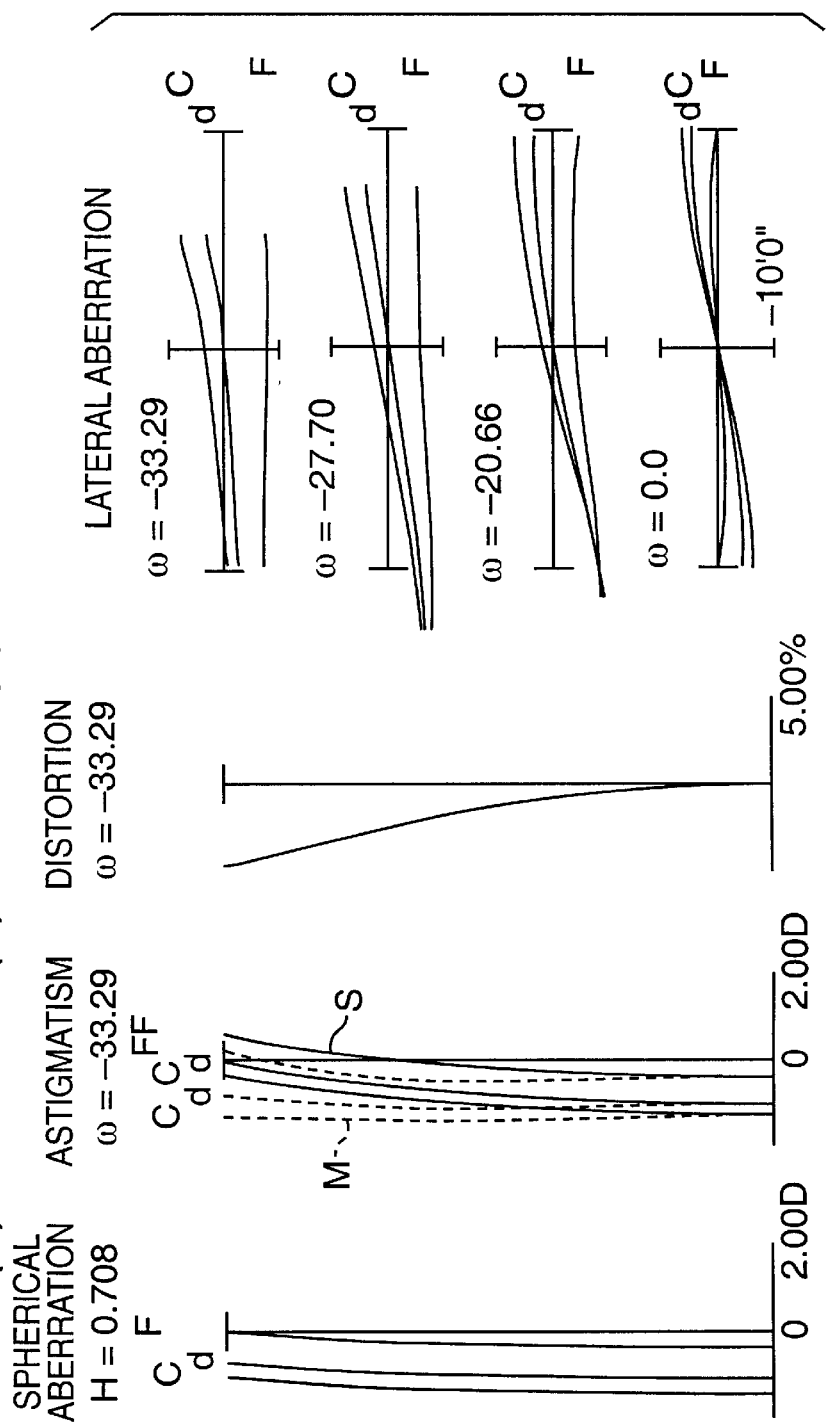

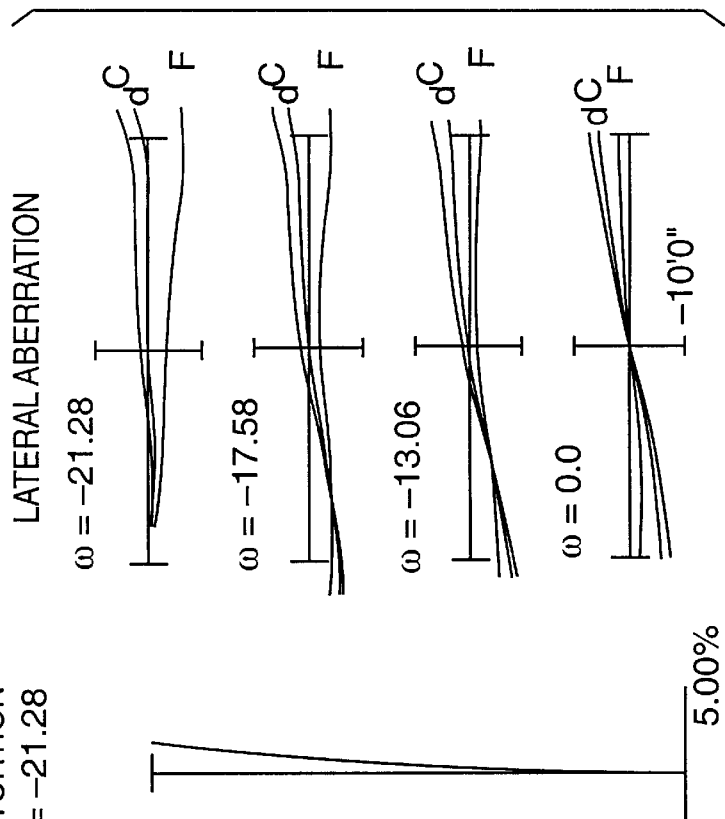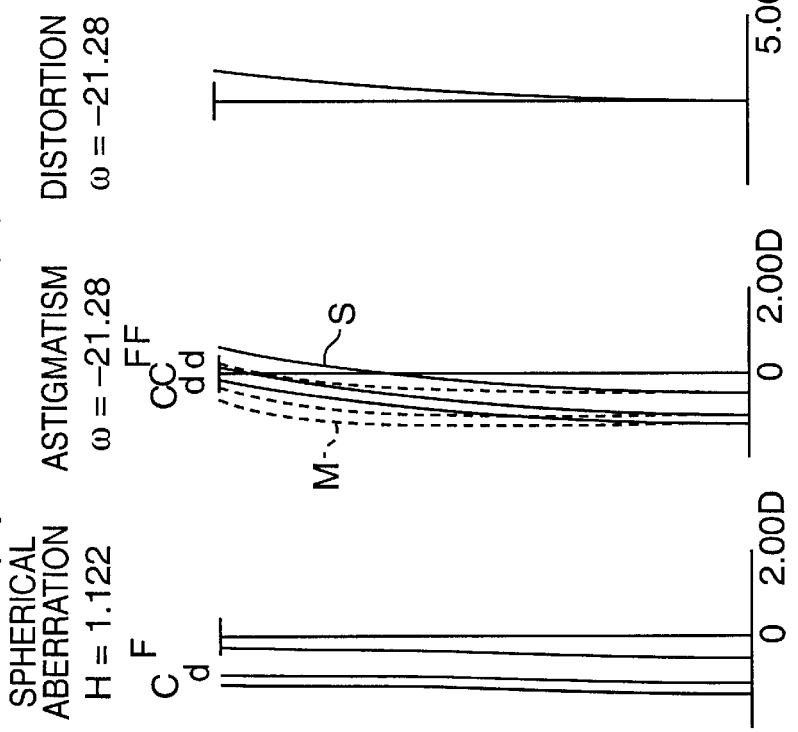

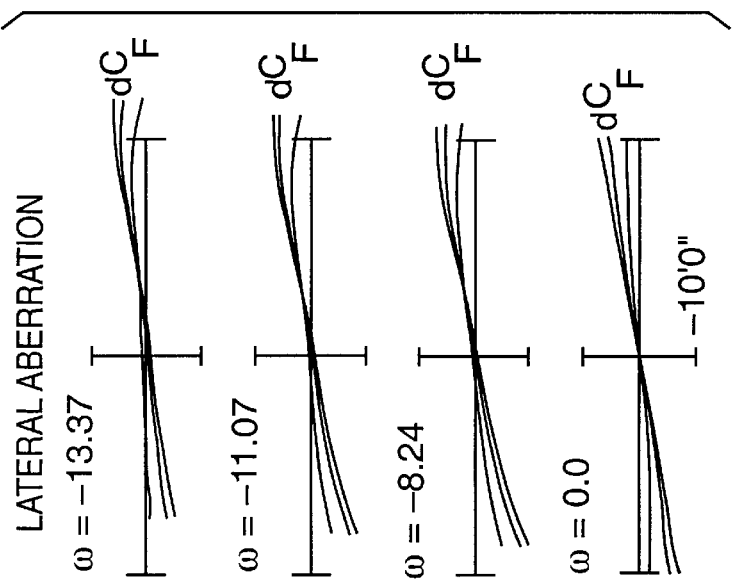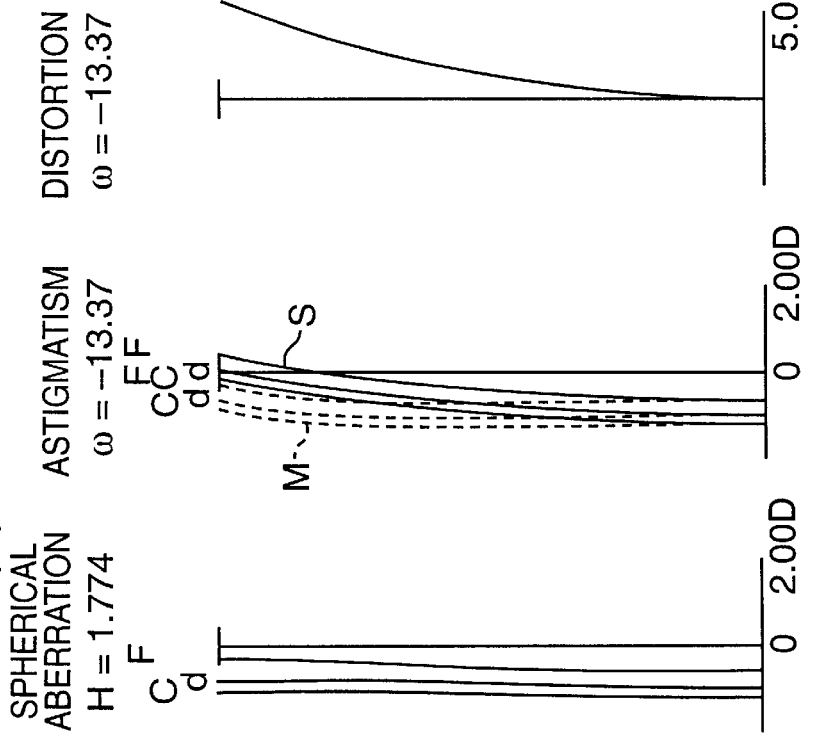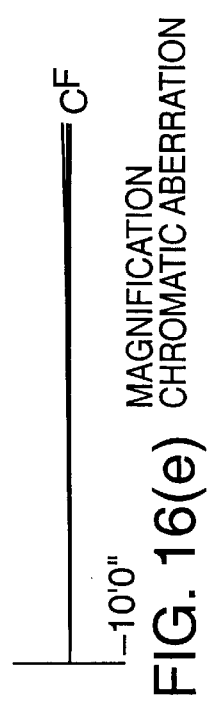

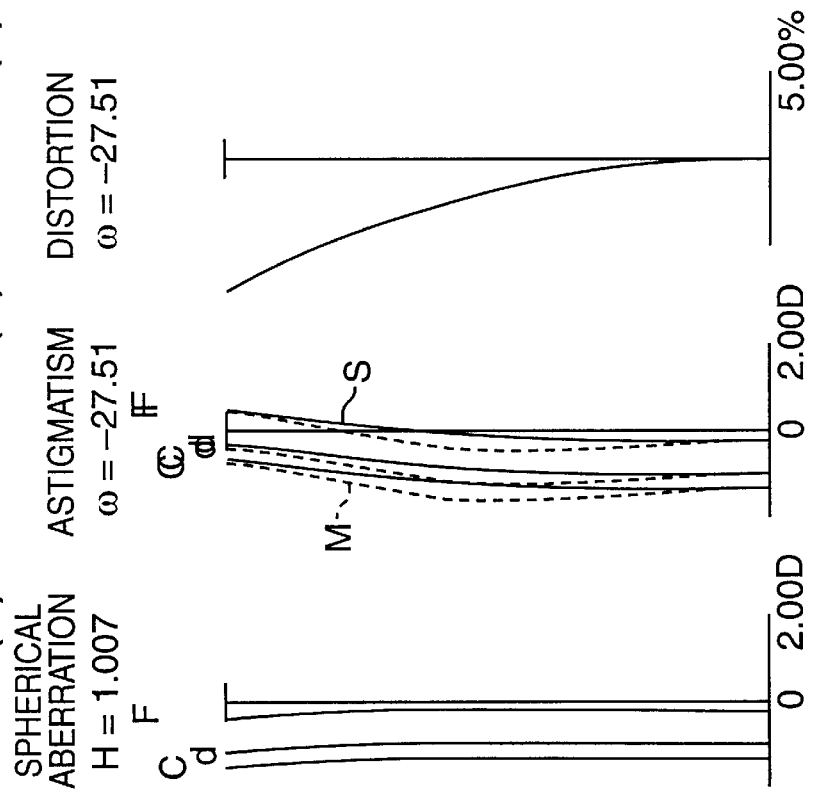

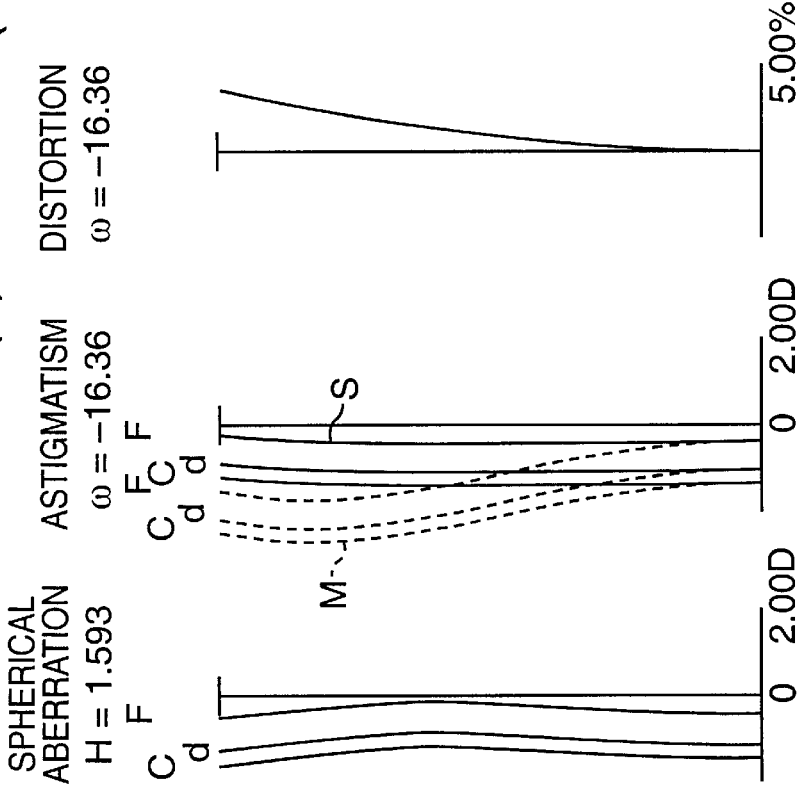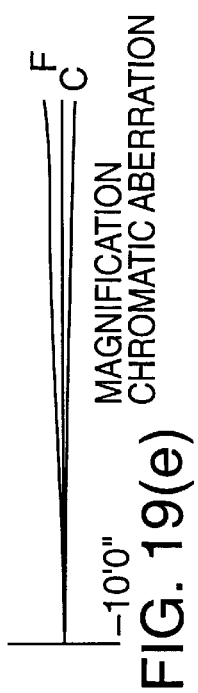

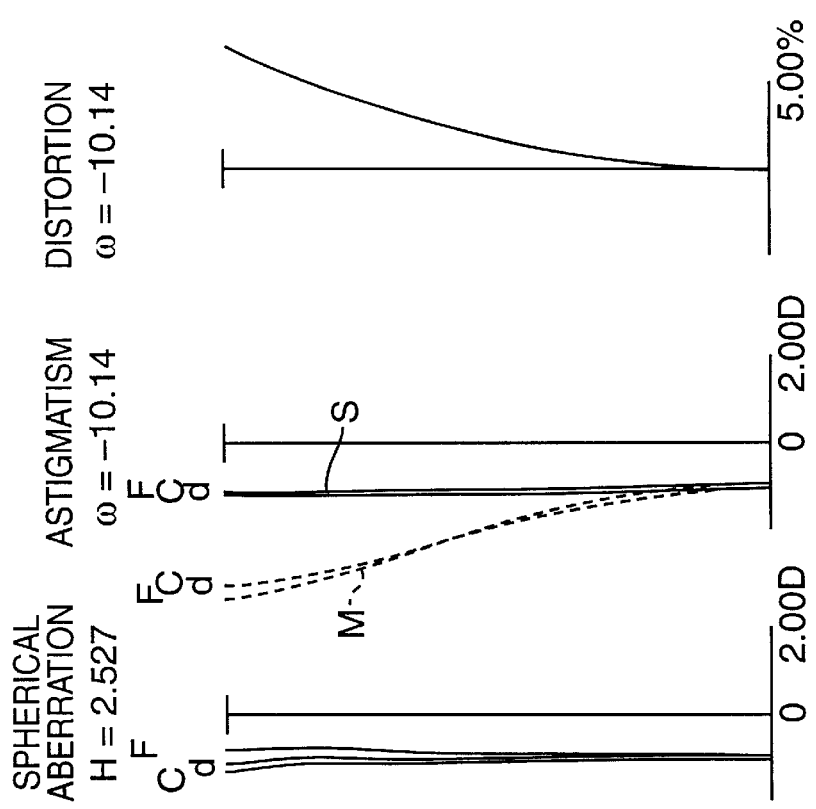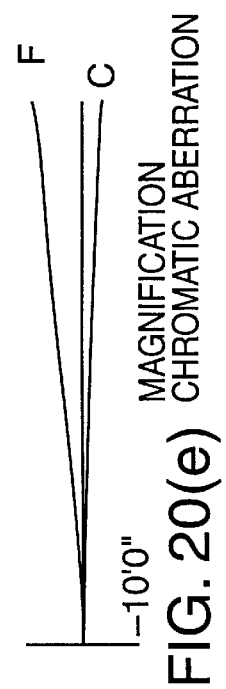

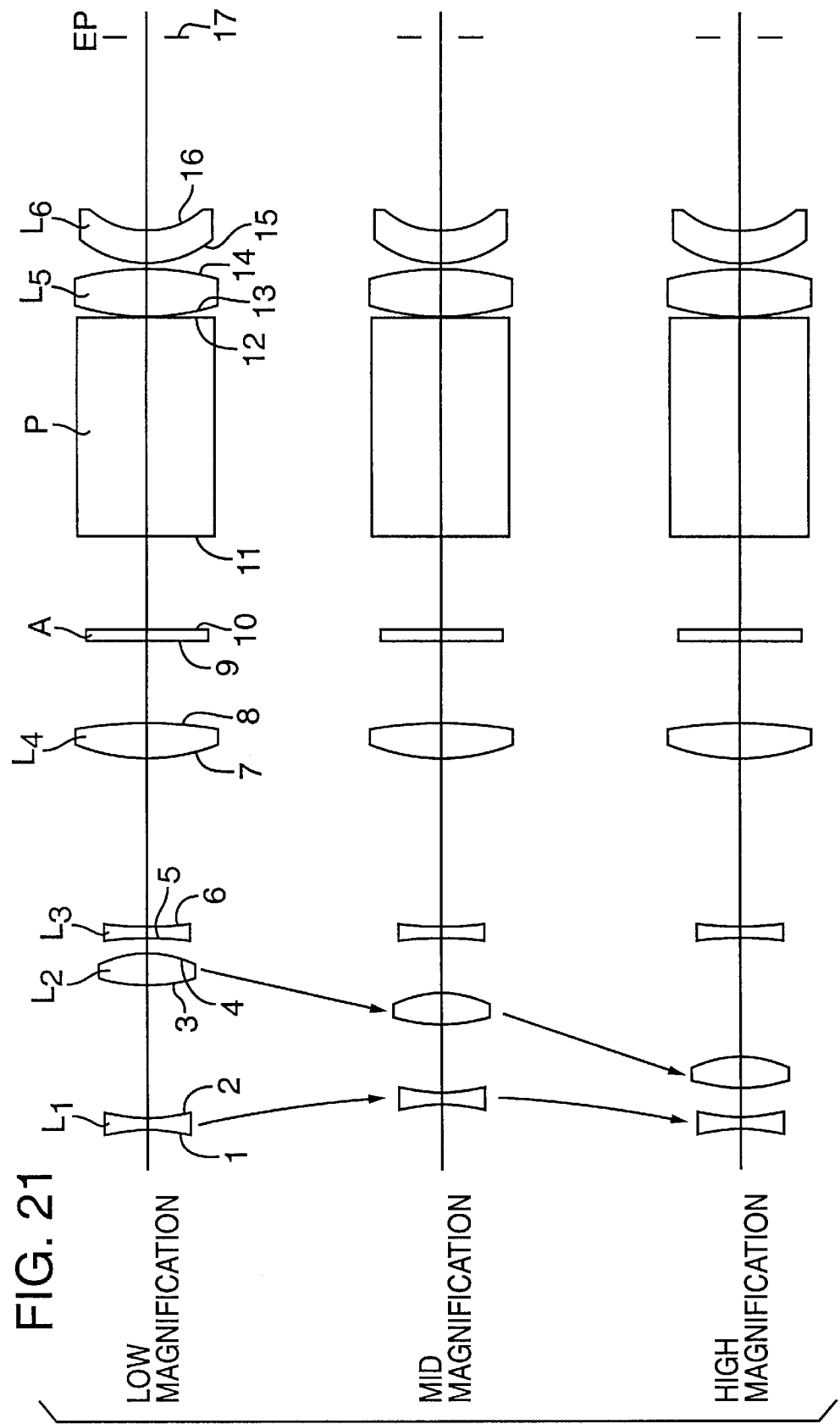

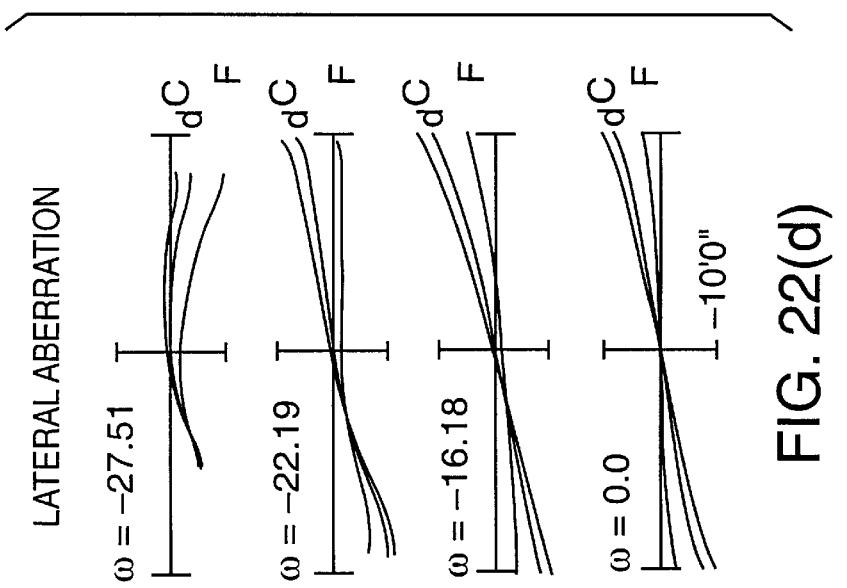
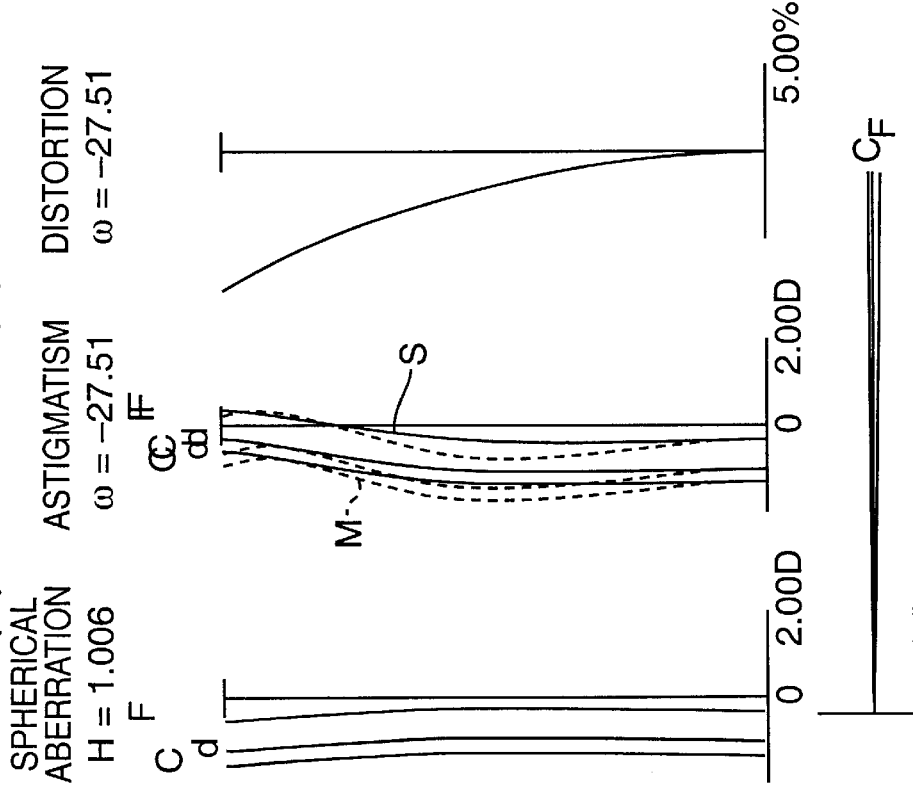

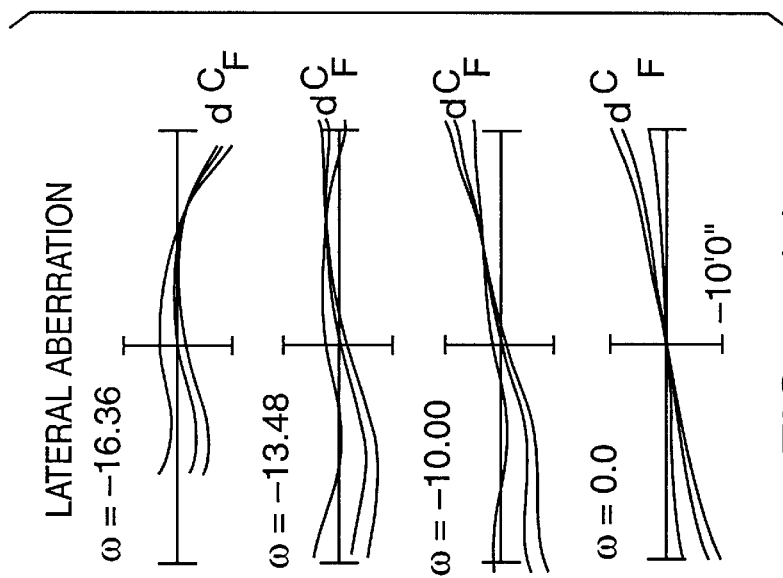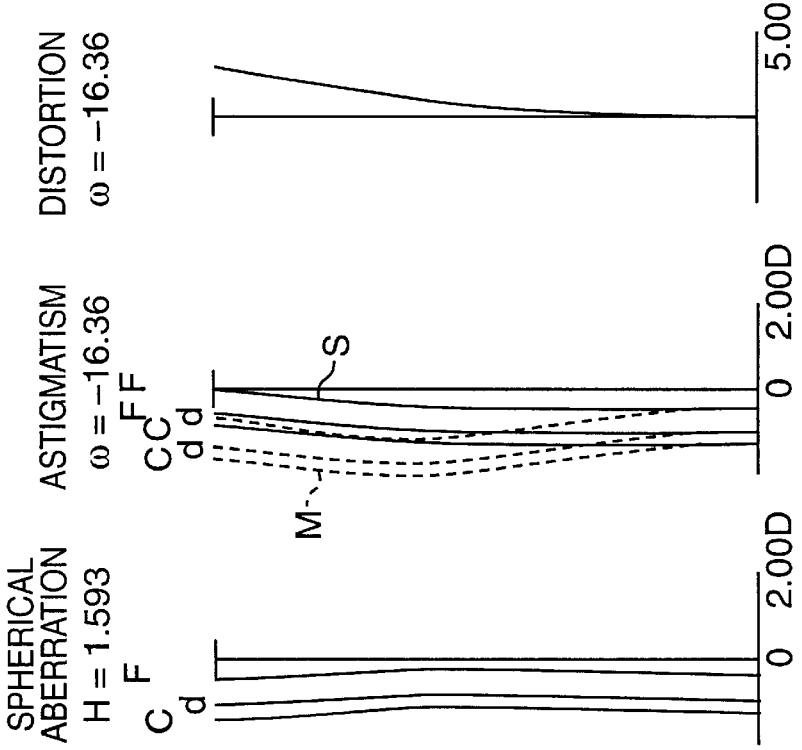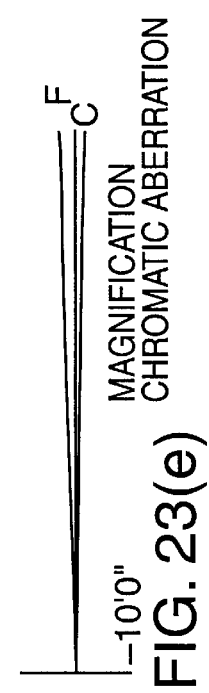

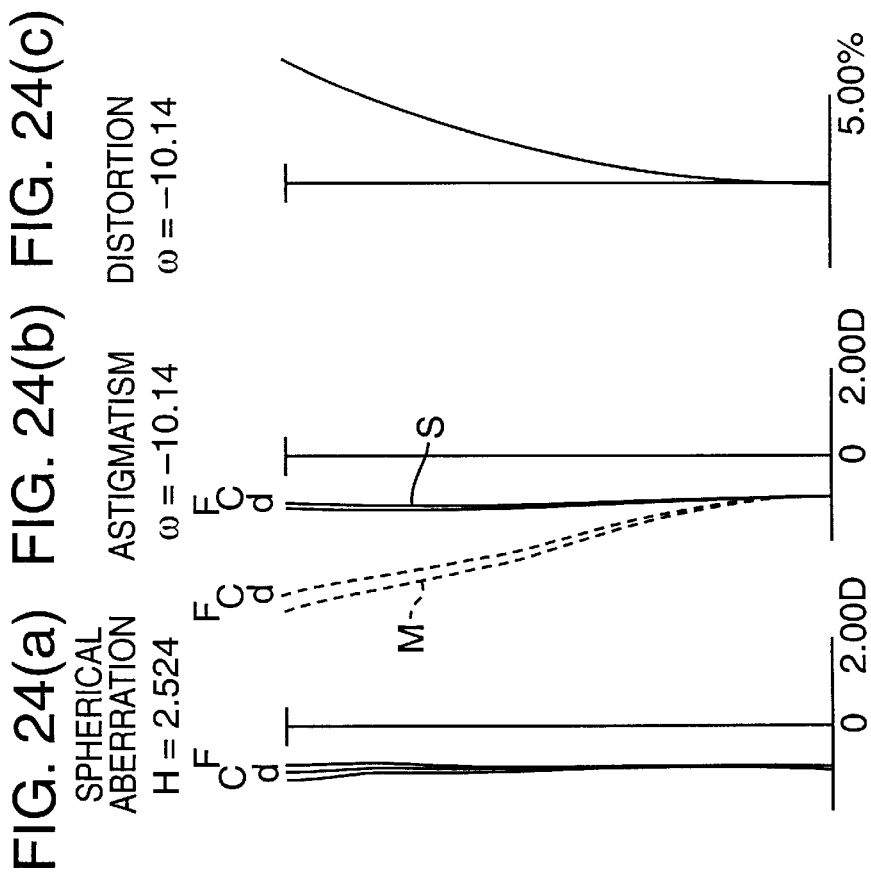

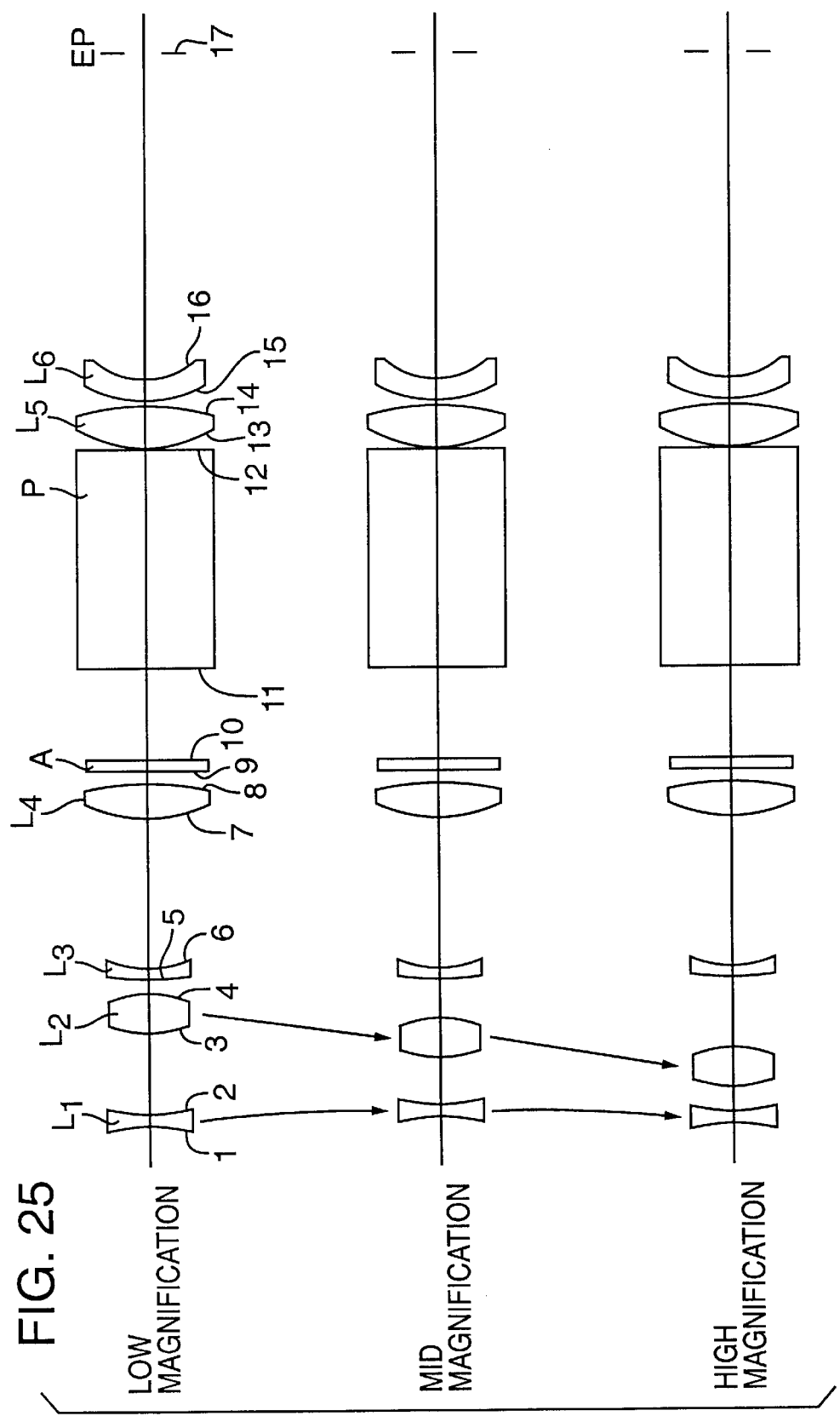

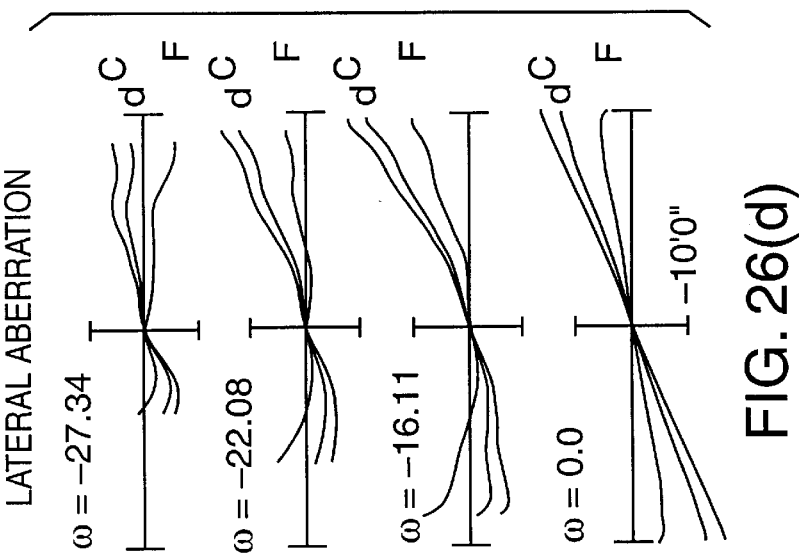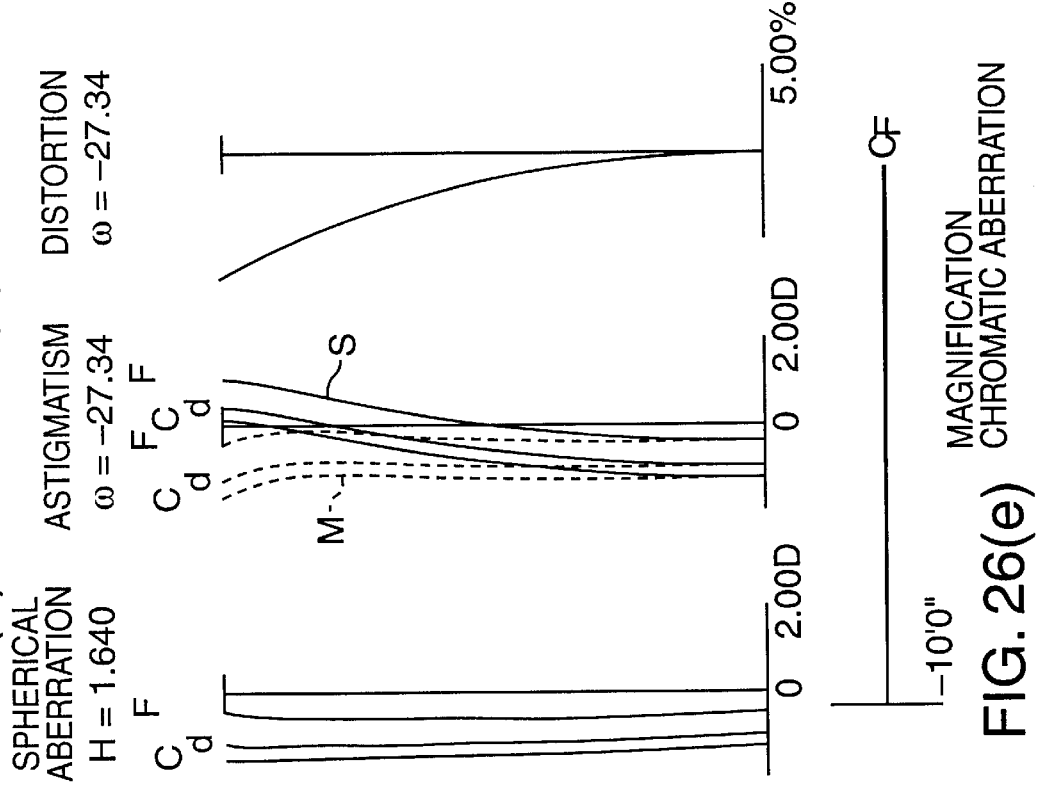

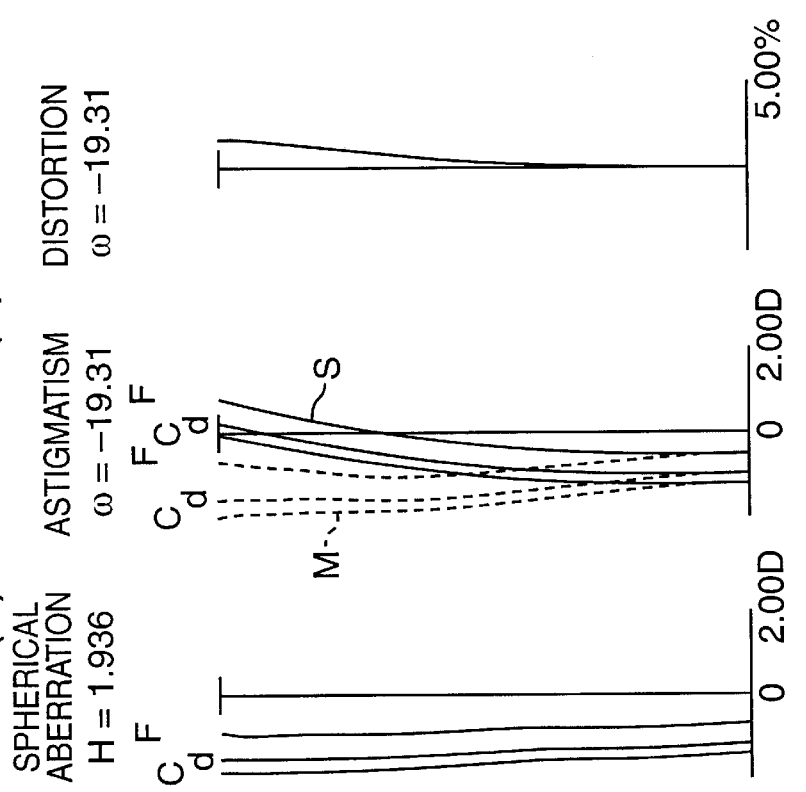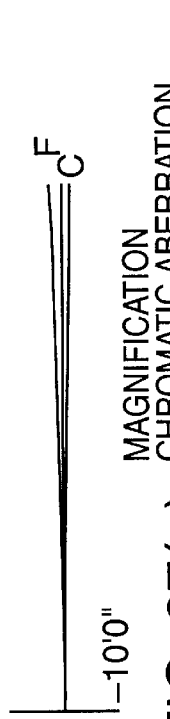

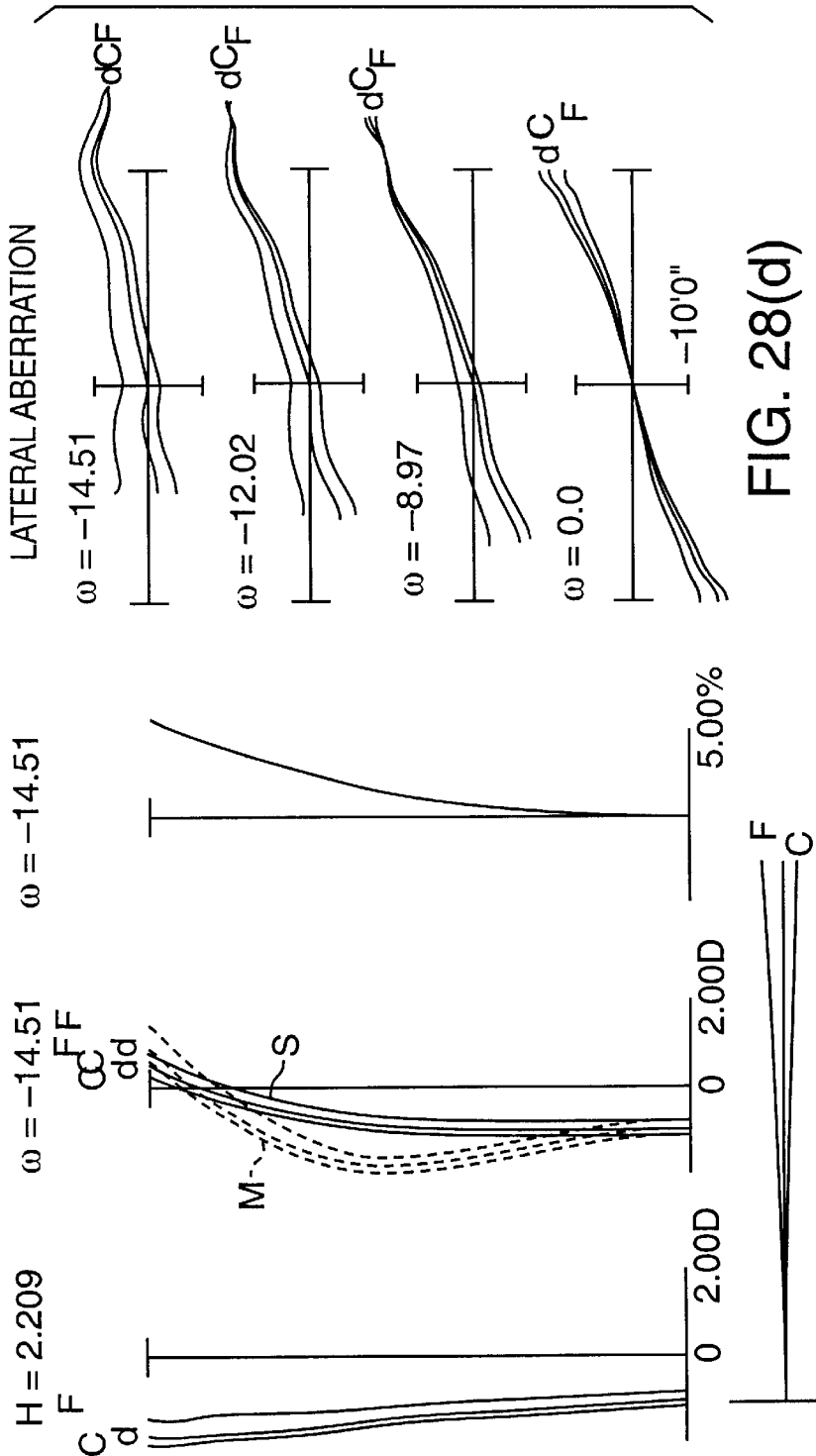

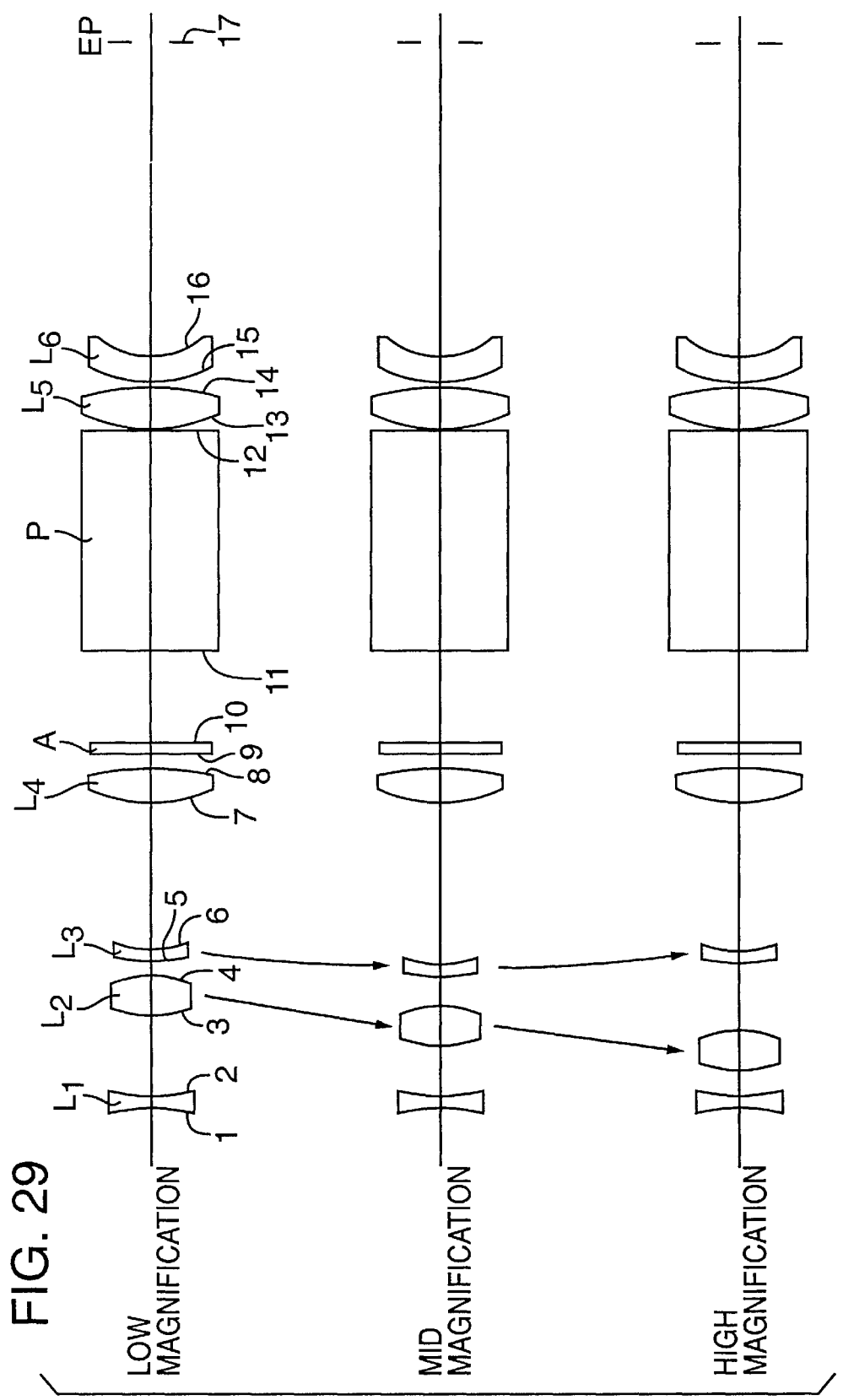

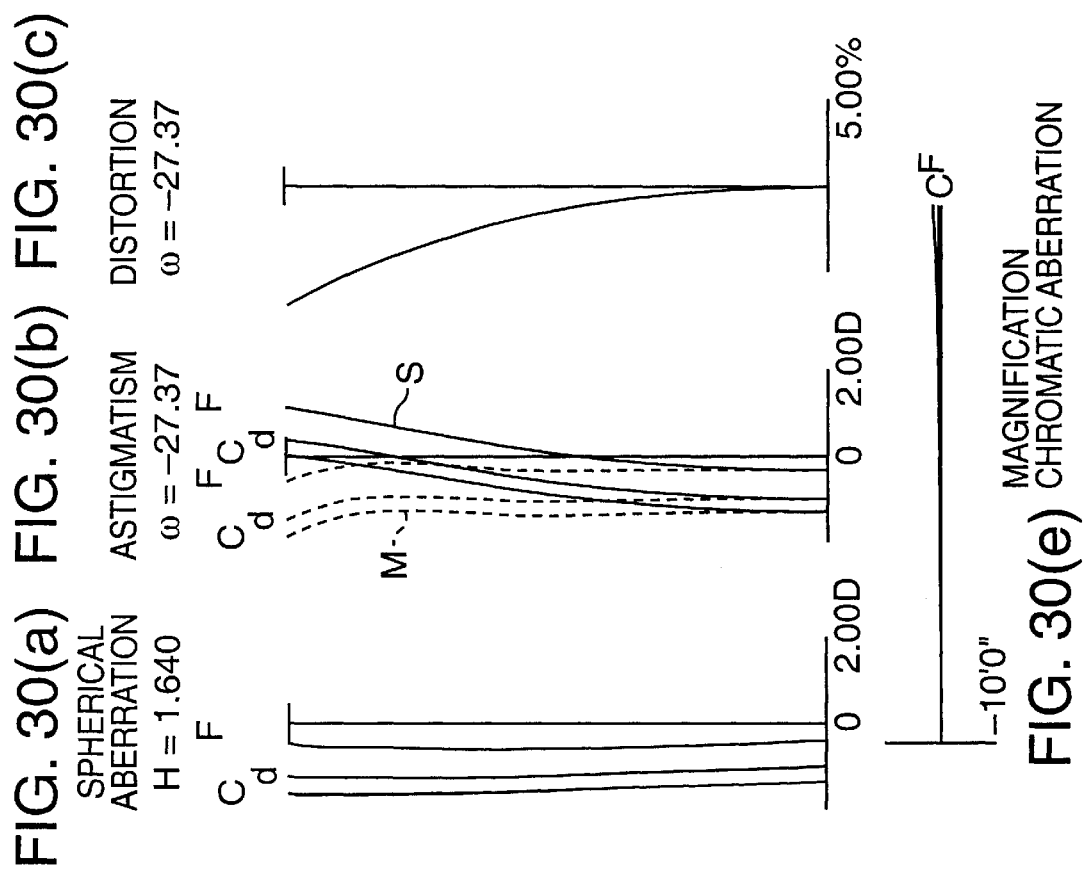

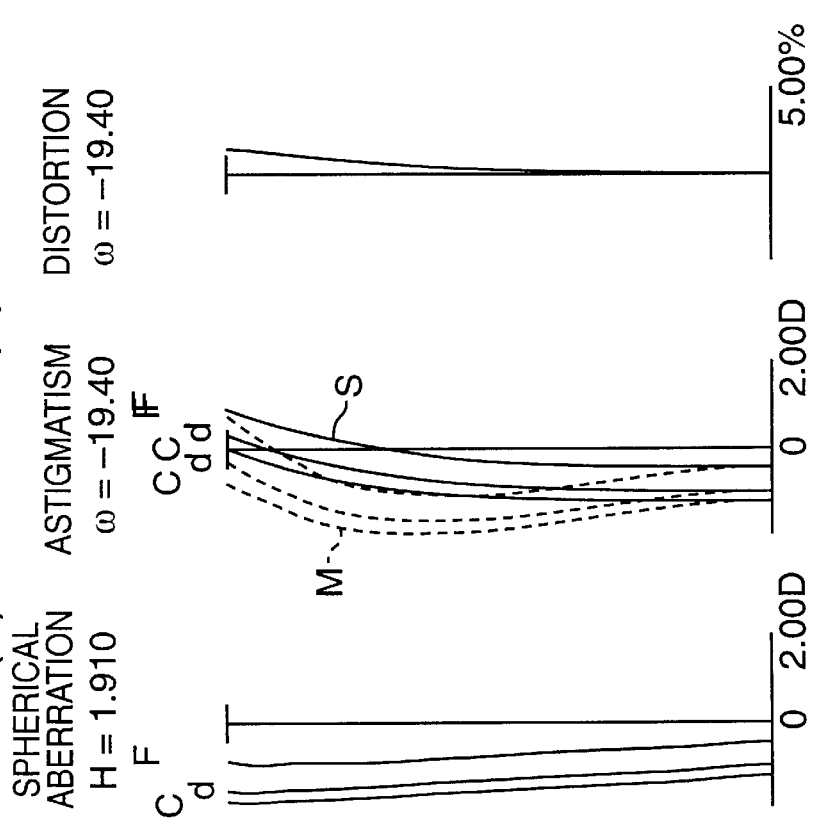

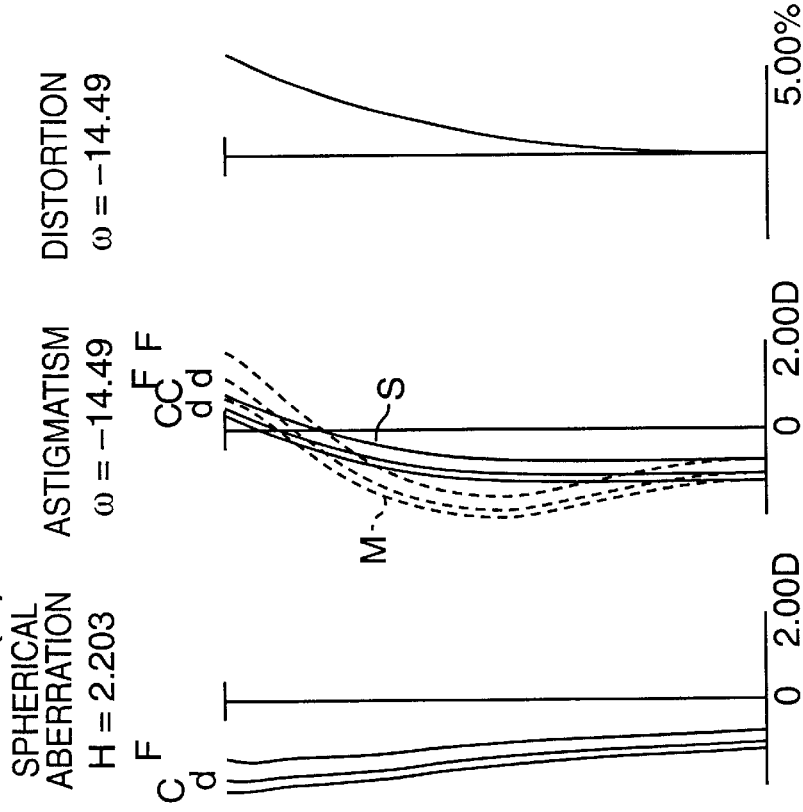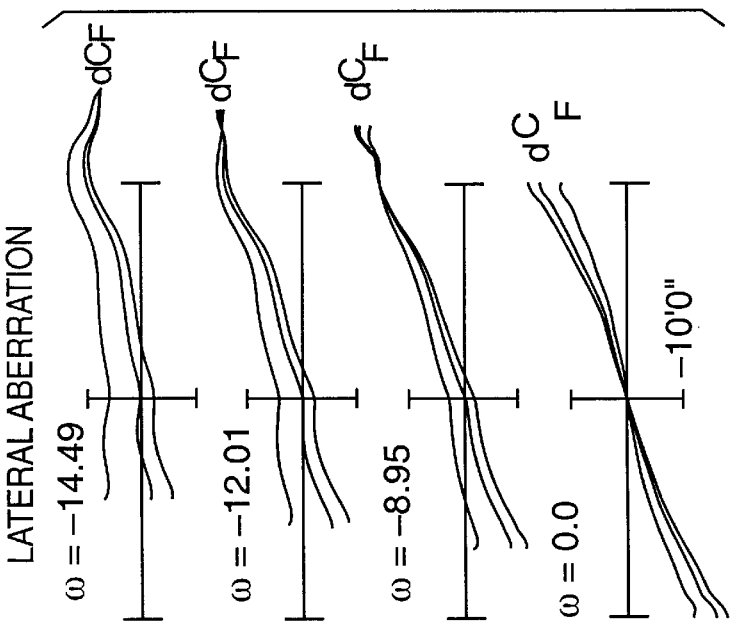

KEPLERIAN VARIABLE MAGNIFICATION VIEWFINDER

FIELD OF THE INVENTION

This invention pertains to viewfinder optical systems as used in, for example, a still camera, video camera, or TV camera. More specifically, the invention pertains to keplerian variable-magnification viewfinders.

BACKGROUND OF THE INVENTION

Keplerian viewfinders comprising a positive objective lens and a positive ocular lens are favored for use as viewfinders on high-quality lens-shutter cameras. In such cameras, keplerian viewfinders allow fields of view, partitioned fields of view and various types of displays to be clearly viewed by arranging the field-of-view frame and the reticle close to the focal point of the objective lens.

The entrance pupil of a keplerian viewfinder is inside the viewfinder itself or on the object side of the viewfinder. Thus, such a viewfinder can be used as a "zoom" viewfinder (in which the viewfinder magnification can be continuously changed over a range) or a "wide-angle" viewfinder while avoiding a need to greatly increase the diameter of the objective lens.

Examples of conventional keplerian viewfinders are disclosed in Japanese Kokai (laid-open) patent document no. 233420 (1991) and Kokai patent document no. 242377 (1994). Such viewfinders comprise, in order from the object side, a first lens group having a negative refractive power and a second lens group having a positive refractive power. A third lens group having a negative refractive power serves as the objective lens.

In recent years, the evolution of lens-shutter cameras has tended toward increasingly smaller camera size. Increasingly smaller cameras require increasingly smaller viewfinders without decreasing the size, brightness, and viewing ease of the image produced by the viewfinder. Also, in recent years, the zoom ratios of lens-shutter cameras have increased. This trend has generated a need to increase the zoom ratio of the viewfinder used with such cameras without significantly increasing the size of the viewfinder.

A compact viewfinder is disclosed in Kokai patent document no. 233420 (1991), wherein each lens group consists of only one lens, and the viewfinder exhibits favorable correction of aberrations. Unfortunately, however, the viewfinder magnification at the wide-angle end is about 0.4, and the zoom ratio is no greater than 2, which is not regarded as sufficiently large for current needs. The viewfinder disclosed in Kokai patent document no. 242377 (1994) has a zoom ratio of 2 or greater, but the magnification on the wide-angle end is about 0.3 and each lens group consists of more than one lens. Such configurations are too costly and bulky for many applications.

SUMMARY OF THE INVENTION

In view of the foregoing, an object of the present invention is to provide a low-cost keplerian variable magnification viewfinder that has a zoom ratio of two or more and a simple composition that favorably corrects all aberrations.

A further object is to provide such a viewfinder having a magnification, at the wide-angle end, of at least 0.5×.

A preferred embodiment of a keplerian viewfinder according to the invention comprises, in order on an optical axis from the object side to the eyepoint side, an objective lens system having positive refractive power and an ocular lens system having positive refractive power. The ocular lens system permits viewing of an image formed by the objective lens system.

The objective lens system comprises, in order from the object side, first, second, and third lens groups $G_1$, $G_2$, and $G_3$, respectively. The first lens group is has a negative focal length $f_1$ and preferably comprises a single negative lens $L_1$. The second lens group has a positive focal length $f_2$ and preferably comprises a single positive lens $L_2$. The third lens group has a negative focal length $f_3$ and preferably comprises a single negative lens $L_3$. The first and second lens groups are axially separated from each other by a first axial airspace $D_{12}$ and the second and third lens groups are separated from each other by a second axial airspace $D_{23}$.

The objective lens system preferably also comprises a fourth lens group $G_4$ having positive refractive power situated toward the eyepoint relative to the third lens group but objectwise of the ocular lens system. The fourth lens group preferably comprises a single positive lens $L_4$.

The ocular lens system comprises a first lens group having positive refractive power and preferably comprising a single positive lens $L_5$. The ocular lens system can also comprise, between the lens $L_5$ and the eyepoint of the viewfinder, a second lens $L_6$ having negative refractive power. If present, the second lens $L_6$ is preferably a negative meniscus lens having a convex surface facing the object side.

The general configuration of the viewfinder achieves a large viewfinder magnification while maintaining a small viewfinder size and excellent correction of aberrations.

For varying the magnification of the viewfinder, two of the first, second, and third lens groups are movable on the optical axis. During such "zooming" from the low-magnification end to the high-magnification end of the viewfinder, the length $D_{12}$ of the first axial airspace is shortened and the length $D_{23}$ of the second axial airspace is lengthened.

Various groups of viewfinder embodiments are encompassed by the invention. In a first group of embodiments (of which multiple examples are disclosed herein), the second and third lens groups are axially movable for zooming and the first lens group is fixed on the optical axis during zooming. During zooming from the low-magnification end to the high-magnification end, the second and third lens groups move toward the first lens group such that the first axial airspace is progressively shortened and the second axial airspace is progressively lengthened. Such a viewfinder preferably satisfies the conditional expression:

$$1.5 < (D_{12w} + D_{23w})/(D_{12t} + D_{23t}) > 3.0$$

wherein $D_{12w}$ and $D_{23w}$ are the respective lengths of the first and second axial airspaces at the low-magnification end, and $D_{12t}$ and $D_{23t}$ are the respective lengths of the first and second axial airspaces at the high-magnification end. Further preferably, at least one of the lens surfaces of the lens $L_2$ is aspherical, and the viewfinder satisfies the following conditional expression:

$$2.3 < |f_3/f_2| < 3.$$

Viewfinders in the first group of embodiments that include the fourth lens group $G_4$ preferably satisfy the conditional expression:

$$-2.2 < \beta_{234t} < -1.2$$

wherein $\beta_{234t}$ is a combined magnification, at the high-magnification end, of the second, third, and fourth lens groups. In embodiments in which the fourth lens group $G_4$ comprises the single positive lens $L_4$ and the ocular lens system comprises the single positive lens $L_5$, the objectwise-facing surface of the lens $L_5$ is preferably aspherical.

Viewfinders in the first group of embodiments also preferably include a first reflector situated between the third and fourth lens groups. In addition, a second reflector (preferably an array of multiple reflectors) is preferably situated toward the object side of the lens $L_5$. The reflectors are useful for reducing the overall size of the viewfinders and for producing an erect image for a user.

In a second group of embodiments, zooming can be performed in several schemes. In a first scheme, the first lens group is stationary. During zooming from the low-magnification end to a mid-magnification setting, the second and third lens groups move toward the first lens group such that the length $D_{12}$ of the first axial airspace is shortened and the length $D_{23}$ of the second axial airspace is lengthened. During zooming from the mid-magnification setting to the high-magnification end, the second lens group continues to move closer to the first lens group but the third lens group moves away from the first and second lens groups such that the first axial airspace is further shortened and the second axial airspace is further lengthened.

In a second zooming scheme, the first and second lens groups are axially movable for zooming and the third lens group is fixed on the optical axis during zooming. During zooming from the low-magnification end to a mid-magnification setting, the first lens group moves toward the eyepoint side and the second lens group moves toward the object side to shorten the first axial airspace and to lengthen the second axial airspace. During zooming from the mid-magnification setting to the high-magnification end, both the first and second lens groups move toward the object side to further shorten the first axial airspace and further lengthen the second axial airspace.

The objective lens system of a viewfinder in the second group of embodiments preferably further comprises a fourth lens group $G_4$ situated between the third lens group $G_3$ and the ocular lens system and having positive refractive power. The fourth lens group preferably comprises a single positive lens $L_4$. The ocular lens system preferably comprises a positive lens group and a negative lens group situated toward the eyepoint side relative to the positive lens group. The positive lens group preferably comprises, as summarized above, a single positive (further preferably biconvex) lens $L_5$ and the negative lens group preferably comprises a single negative meniscus lens $L_6$ with a convex surface facing objectwise.

Such viewfinders in the second group of embodiments preferably satisfy the conditional expressions:

$$-2.5 < f_3/f_5 < -0.5$$

$$0.55 < f_{123w}/f_e < 1.0$$

wherein $f_5$ is the focal length of the positive lens $L_5$, $f_{123w}$ is the combined focal length, at the low-magnification end, of the first, second, and third lens groups, and $f_e$ is the focal length of the ocular lens system.

Such viewfinders in the second group of embodiments preferably also satisfy the conditional expression:

$$0.2 < |S_2/S_1| < 0.4$$

wherein $S_1$ and $S_2$ are displacement amounts $S(y)$ pertaining to the aspherical surface on the object side and eyepoint side, respectively, of the lens $L_2$ along the optical axis at a height $y = |0.25 r_3|$ from the optical axis, as defined by:

$$S(y) = \frac{y^2/R}{1 + \sqrt{1 - \kappa \cdot y^2/R^2}} + \sum_{n=2} C_n \times |y^n| - \frac{y^2/r}{1 + \sqrt{1 - y^2/r^2}}$$

wherein $r$ is a corresponding paraxial curvature radius defined by $r = 1/(2C_2 - 1/R)$, $\kappa$ is a conical constant, $C_n$ is an nth degree aspherical surface coefficient, and $r_3$ is a paraxial curvature radius of the object-side aspherical surface of the lens $L_2$.

Such viewfinders in the second group of embodiments also preferably satisfy the conditional expressions:

$$1 < \beta_{34w} < 1.4$$

$$-0.4 < (r_1 + r_2)/(r_1 - r_2) < 0.2$$

wherein $\beta_{34w}$ is the combined magnification, at: the low-magnification side, of the third and fourth lens groups, $r_1$ is the curvature radius of the lens surface on the object side of the lens $L_1$, and $r_2$ is the paraxial curvature radius of the lens surface on the eyepoint side of the lens $L_1$.

A viewfinder in the second group of embodiments also preferably comprises, in the objective lens system, a first reflector situated in an axial airspace between the third and fourth lens groups. The viewfinder also preferably comprises a second reflector (more preferably multiple reflectors) between the fourth lens group and the lens $L_5$. The reflectors serve to reduce the overall size of the viewfinder and to produce an erect image for viewing.

The foregoing and other features and advantages of the invention will be more apparent from the following detailed description which proceeds with reference to the accompanying drawings.

BRIEF DESCRIPTION OF THE DRAWINGS

FIGS. 2(a)–2(e) are aberration plots for Example Embodiment 1 at a low-magnification zoom setting.

FIGS. 3(a)–3(e) are aberration plots for Example Embodiment 1 at a middle-magnification zoom setting.

FIGS. 4(a)–4(e) are aberration plots for Example Embodiment 1 at a high-magnification zoom setting.

FIG. 5 is an optical diagram of a viewfinder according to Example Embodiment 2, showing lens positions for achieving magnification at the low-magnification end (top), a mid-magnification setting (middle), and the high-magnification end (bottom).

FIGS. 6(a)–6(e) are aberration plots for Example Embodiment 2 at a low-magnification zoom setting.

FIGS. 7(a)–7(e) are aberration plots for Example Embodiment 2 at a middle-magnification zoom setting.

FIGS. 8(a)–8(e) are aberration plots for Example Embodiment 2 at a high-magnification zoom setting.

FIGS. 10(a)–10(e) are aberration plots for Example Embodiment 3 at a low-magnification zoom setting.

FIGS. 11(a)–11(e) are aberration slots for Example Embodiment 3 at a middle-magnification zoom setting.

FIGS. 12(a)–12(e) are aberration plots for Example Embodiment 3 at a high-magnification zoom setting.

FIG. 13 is an optical diagram of a viewfinder according to Example Embodiment 4, showing lens positions for achieving magnification at the low-magnification end (top), a mid-magnification setting (middle), and the high-magnification end (bottom).

FIGS. 14(a)–14(e) are aberration plots for Example Embodiment 4 at a low-magnification zoom setting.

FIGS. 15(a)–15(e) are aberration plots for Example Embodiment 4 at a middle-magnification zoom setting.

FIGS. 16(a)–16(e) are aberration plots for Example Embodiment 4 at a high-magnification zoom setting.

FIGS. 18(a)–18(e) are aberration plots for Example Embodiment 5 at a low-magnification zoom setting.

FIGS. 19(a)–19(e) are aberration plots for Example Embodiment 5 at a middle-magnification zoom setting.

FIGS. 20(a)–20(e) are aberration plots for Example Embodiment 5 at a high-magnification zoom setting.

FIG. 21 is an optical diagram of a viewfinder according to Example Embodiment 6, showing lens positions for achieving magnification at the low-magnification end (top), a mid-magnification setting (middle), and the high-magnification end (bottom).

FIGS. 22(a)–22(e) are aberration plots for Example Embodiment 6 at a low-magnification zoom setting.

FIGS. 23(a)–23(e) are aberration plots for Example Embodiment 6 at a middle-magnification zoom setting.

FIGS. 24(a)–24(e) are aberration plots for Example Embodiment 6 at a high-magnification zoom setting.

FIG. 25 is an optical diagram of a viewfinder according to Example Embodiment 7, showing lens positions for achieving magnification at the low-magnification end (top), a mid-magnification setting (middle), and the high-magnification end (bottom).

FIGS. 26(a)–26(e) are aberration plots for Example Embodiment 7 at a low-magnification zoom setting.

FIGS. 27(a)–27(e) are aberration plots for Example Embodiment 7 at a middle-magnification zoom setting.

FIGS. 28(a)–28(e) are aberration plots for Example Embodiment 7 at a high-magnification zoom setting.

FIG. 29 is an optical diagram of a viewfinder according to Example Embodiment 8, showing lens positions for achieving magnification at the low-magnification end (top), a mid-magnification setting (middle), and the high-magnification end (bottom).

FIGS. 30(a)–30(e) are aberration plots for Example Embodiment 8 at a low-magnification zoom setting.

FIGS. 31(a)–31(e) are aberration plots for Example Embodiment 8 at a middle-magnification zoom setting.

FIGS. 32(a)–32(e) are aberration plots for Example Embodiment 8 at a high-magnification zoom setting.

DETAILED DESCRIPTION

1. General Configuration

Figure 33:
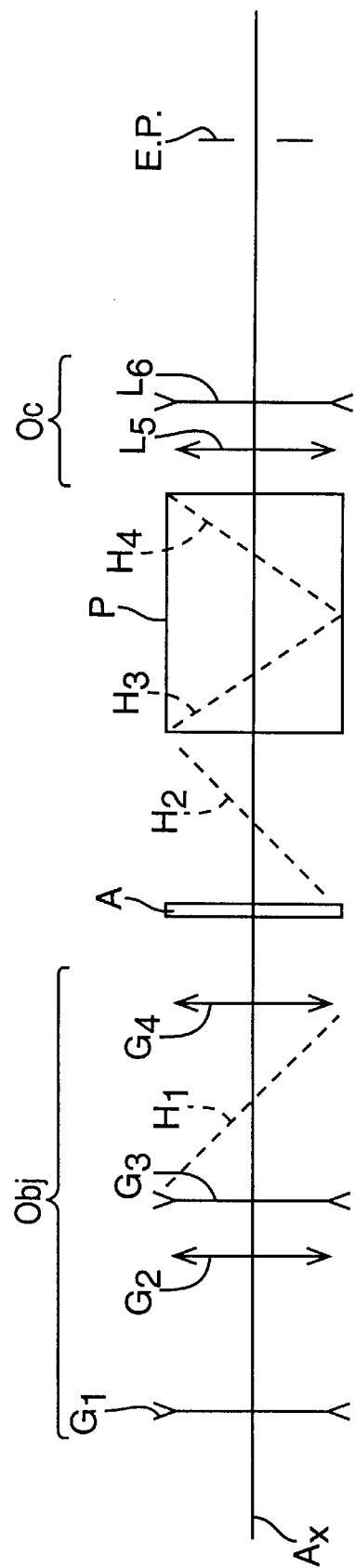
FIG. 33 is a schematic optical diagram showing certain general features of keplerian variable-magnification viewfinders according to the invention.

As shown generally in FIG. 33, a keplerian variable-magnification viewfinder according to a preferred embodiment of the present invention comprises, in order from the object side on an optical axis, an objective lens system denoted "Obj" and an ocular lens system denoted "Oc". Each of the objective and ocular lens systems has positive refractive power.

The objective lens system is operable to increase the magnification of the viewfinder. Enlarging the image by the objective lens system allows the image as viewed by the eye through the ocular lens system to appear large in a manner similar to Loupe magnification.

A preferred embodiment of the objective lens system comprises, from the object side, first, second, and third lens groups $G_1$, $G_2$, $G_3$, respectively. The first lens group $G_1$ is negative (preferably comprising a single negative lens $L_1$), the second lens group $G_2$ is positive (preferably comprising a single positive lens $L_2$), and the third lens group $G_3$ is negative (preferably comprising a single negative lens $L_3$). (Individual lenses are shown, e.g., in FIG. 1.) The first and second lens groups $G_1$, $G_2$, respectively, have a positive combined refractive power and serve as the principal imaging lenses of the objective lens system.

The third lens group $G_3$ serves to increase the overall focal length of the first and second lens groups $G_1$, $G_2$. Thus, it is possible to increase the focal length of the objective lens system without significantly increasing the size of the objective lenses.

The objective lens system also preferably comprises a fourth lens group $G_4$ (preferably comprising a single positive lens $L_4$) having a positive refractive power disposed on the eyepoint side of the third lens group $G_3$. With such a configuration, the third and fourth lens groups $G_3$, $G_4$ collectively function as a so-called "rear converter" that changes the combined focal length of the first and second lens groups $G_1$, $G_2$, and corrects any aberrations (especially distortion) that cannot be fully corrected by the first and second lens groups. The rear converter also functions as a field lens that guides the light flux through the viewfinder to a suitable eyepoint position.

For variable magnification, the viewfinder lens has a "zoom" function. The zoom ratio is preferably two or greater. Zooming can be performed in any of several possible actions (schemes). Any of the zooming actions allows control of variations in the pupil position and in anastigmatic aberrations.

In a first zooming action, the first lens group $G_1$ is fixed on the optical axis and the second and third lens groups $G_2$, $G_3$ are moved along the optical axis. During zooming from the low-magnification end to the high-magnification end, the second and third lens groups $G_2$, $G_3$ move axially toward the first lens group $G_1$ while the axial airspace between the first and second lens groups $G_1$, $G_2$ decreases in length and the axial airspace between the second and third lens groups $G_2$, $G_3$ increases in length. In the first zooming action, the object point of the second lens group $G_2$ remains fixed during zooming. Example Embodiments 1–4 below exemplify the first zooming action.

A second zooming action is a variation of the first zooming action, where the first lens group $G_1$ remains stationary. In the second zooming action, during zooming from the low-magnification end to a mid-magnification setting, the second and third lens groups $G_2$, $G_3$ move toward the first lens group $G_1$, while the axial airspace between the second and third lens groups increases and the axial airspace between the first and second lens groups decreases. During zooming from the mid-magnification setting to the high-magnification end, the second lens group $G_2$ continues to move toward the first lens group $G_1$, thereby further shortening the axial airspace between the first and second lens groups. The third lens group $G_3$, however, moves in the eyepoint direction away from the second lens group $G_2$, thereby further increasing the length of the axial airspace between the second and third lens groups. Example Embodiments 5 and 8 exemplify the second zooming action.

In a third zooming action, the third lens group $G_3$ is fixed on the optical axis and the first and second lens groups $G_1$, $G_2$ are moved along the optical axis. When zooming from the low-magnification end to a mid-magnification setting, the first lens group $G_1$ moves imagewise, and the second lens group $G_2$ moves objectwise away from the third lens group $G_3$ (i.e., the axial airspace between the second and third lens groups increases in length). When zooming from the mid-magnification setting to the high-magnification end, the first lens group $G_1$ moves objectwise, and the second lens group moves objectwise away from the third lens group $G_3$ (i.e., both the first and second lens groups move away from the third lens group and the first and second lens move close together). Example Embodiments 6 and 7, below, exemplify the third zooming action.

The various zooming actions achieve favorable correction of aberrations by the axial airspace $D_{23}$ between the second lens group $G_2$ and the third lens group $G_3$ increasing in length when zooming from the low-magnification end toward the high-magnification end. During such zooming, the composite magnification $\beta_{23}$ of the second lens group $G_2$ and the third lens group $G_3$ at the high-magnification side can be maintained at 2× or more when increasing the axial length of the airspace $D_{23}$ in contrast to approximately 1× when decreasing the axial length of the airspace $D_{23}$. In other words, since the subsequent magnification achieved by the second lens group $G_2$ is large, the power of the first lens group $G_1$ can be increased. This enables a reduction in the axial distance the second lens group $G_2$ moves to produce the required zoom ratio.

The negative-positive-negative configuration of the lens groups $G_1$–$G_3$ can be symmetrical, as exemplified in Example Embodiments 1–4, below. A symmetrical configuration is advantageous for correcting distortion and coma even when each lens group $G_1$–$G_4$ of the objective lens system comprises only one lens and the zoom ratio is two or greater.

It is further preferable for the objective lens system to comprise a lens having a positive aspherical lens surface on the object side. This can be done, for example, by making the object-facing surface of the lens $L_2$ and/or the object-facing surface of the lens $L_4$ aspherical.

A viewfinder according to the present invention preferably forms an erect image. To such end, the viewfinder preferably further comprises a relay lens or a "reflector array" such as a reflective image erector. Employing a reflector array for erecting the image is preferable to employing a relay lens. A configuration that includes a reflector array facilitates keeping the overall size of the viewfinder small and adequately correcting aberrations without having to include additional lens elements for aberration correction.

If a fourth lens group $G_4$ is employed, the reflector array can comprise a first "reflection means" (providing a first reflective surface $H_1$) situated in the axial airspace between the third lens group $G_3$ and the fourth lens group $G_4$. I.e., with the third and fourth lens groups $G_3$, $G_4$ functioning as a rear converter and with the combined magnification of the third and fourth lens groups $G_3$, $G_4$ preferably being 1× or greater, the third and fourth lens groups typically have a sufficiently long axial airspace between them to accommodate the first reflective surface $H_1$.

It is further preferable for the ocular lens system to comprise a second reflection means, preferably comprising three reflective surfaces $H_2$, $H_3$, $H_4$, disposed at the eyepoint side of an image produced by the objective lens system but objectwise of the ocular lens system. By reflecting the image, the three reflective surfaces $H_2$–$H_4$ shorten the optical distance from the image to the ocular lens system. Such an arrangement also allows the focal length $f_e$ of the ocular lens system to be reduced and the Loupe magnification of the viewfinder to be increased. The resulting configuration provides a viewfinder exhibiting small size, high magnification, and clear imaging, and that can be made at low cost.

The ocular lens system comprises a positive lens $L_5$. Placing the three reflective surfaces $H_2$–$H_4$ between the lens $L_4$ and the positive lens $L_5$ facilitates increasing the refractive power of the positive lens $L_5$ to increase the Loupe magnification of the viewfinder. As a result, high-magnification viewfinders can be made at comparatively lower cost and smaller size. In order to obtain correction of symmetrical coma aberrations in the ocular lens system, the positive lens $L_5$ preferably has an aspheric surface.

Example Embodiments 1–4 below are directed to embodiments in which the ocular lens system consists of the positive lens $L_5$. The group of viewfinder embodiments in which the ocular lens system consists of the positive lens $L_5$ is termed herein the "first group" of embodiments.

The ocular lens system can also comprise, in addition to the positive lens $L_5$ and located in the eyepoint direction relative to the lens $L_5$, a negative lens $L_6$. The negative lens $L_6$ is preferably a meniscus lens having a convex surface oriented objectwise. Such a combination allows the focal length of the ocular lens system to be shortened without causing an increase in the effective diameter of the ocular lens system or an increase in the refractive power of each lens. The group of embodiments in which the ocular lens system comprises both the lenses $L_5$ and $L_6$ is termed the "second group" of embodiments. Example Embodiments 5–8 are directed to the second group of embodiments.

2. First Group of Embodiments

In the first group of embodiments exhibiting the first zooming action, the following conditional expression i s preferably satisfied:

$$1.5 < (D_{12t} + D_{23w})/(D_{12t} + D_{23t}) < 3.0 \quad (1)$$

wherein $D_{12w}$ is the axial distance between the first lens group $G_1$ and the second lens group $G_2$ at the low-magnification end, $D_{23}w$ is the axial distance between the second lens group $G_2$ and the third lens group $G_3$ at the low-magnification end, $D_{12t}$ is the axial distance between the first lens group $G_1$ and the second lens group $G_2$ at the high-magnification end, and $D_{23t}$ is the axial distance between the second lens group $G_2$ and the third lens group $G_3$ at the high-magnification end. If the stated ratio were to fall below the lower limit of conditional expression (1), then the magnification of the third lens group $G_3$ at the high-magnification end would be smaller than the magnification of the third lens group at a mid-range magnification zoom setting. Such a condition would cause the amount of axial movement of the second lens group $G_2$ to be too large, thereby undesirably increasing the size of the viewfinder. If the upper limit of conditional expression (1) were to be exceeded, then the position at which chief rays pass through the first lens group $G_1$ at the low-magnification end would be excessively displaced from the optical axis. This would require an excessive increase in the diameter of the first lens group $G_1$, masking the viewfinder too large to be practical.

In order to increase the axial length $D_{23t}$ of the airspace between the second lens group $G_2$ and the third lens group $G_3$ at the high-magnification end, the following conditional expression is preferably satisfied:

$$2.3 < |f_3/f_2| < 3 \quad (2)$$

wherein $f_2$ is the focal length of the second lens group $G_2$ and $f_3$ is the focal length of the third lens group $G_3$.

Exceeding the upper limit of conditional expression (2) would cause the axial airspace $D_{23}$ to move in a direction that reduces the magnification at the high-magnification end. This would cause the composite magnification $\beta_{23}$ of the second and third lens groups $G_2$, $G_3$ to be too small at the high-magnification end. Because the power of the second lens group $G_2$, which is the main variable-magnification group, thus must be larger, spherical aberration and coma would increase to unacceptable levels, making it difficult to obtain favorable correction of these aberrations. Falling below the lower limit of conditional expression (2) would cause an undesirable reduction in the power of the second lens group $G_2$. This, in turn, would necessitate excessive axial movement of the second lens group $G_2$ for zooming.

In order for the second lens group $G_2$ to comprise only a single lens $L_2$ while favorably correcting spherical aberrations at the high-magnification end and coma aberrations at the low-magnification end, at least one lens surface of the lens $L_2$ is preferably aspheric.

If the fourth lens group $G_4$ is included in the first group of embodiments, a desirable small size of the viewfinder is obtained if the following conditional expression is satisfied:

$$-2.2 < \beta_{234t} < -1.2 \quad (3)$$

wherein $\beta_{234t}$ is the combined magnification, at the high-magnification end, of the second lens group $G_2$, the third lens group $G_3$, and the fourth lens group $G_4$.

Exceeding the upper limit of conditional expression (3) would cause the focal length of the first lens group $G_1$ to be large in order to obtain a large field of view at the low-magnification end. This would make correcting spherical aberrations at the high-magnification end more difficult. Falling below the lower limit of conditional expression (3) would cause the magnification at the high magnification side to be too small; thus, in order to obtain a sufficiently large viewfinder magnification, the focal length of the first lens group $G_1$ would have to be made excessively large.

3. Second Group of Embodiments

With respect to the second group of embodiments (in which the ocular lens system includes the negative lens $L_6$), a longer eye relief (i.e., distance from the user's eye to the lens surface closest to the user's eye) can be obtained when the following conditional expression be satisfied:

$$-2.5 < f_3/f_5 < -0.5 \quad (4)$$

wherein $f_3$ is the focal length of the third lens group $G_3$ and $f_5$ is the focal length of the lens $L_5$.

Falling below the lower limit of conditional expression (4) (which can result from the focal length $f_5$ being too small) would cause a greater deflection of rays entering the eye. This can result in vignetting. Exceeding the upper limit (which can result from the focal length $f_5$ being too large) could cause a reduction in the effectiveness of moving the principal point of the ocular lens system toward the object side. I.e., the principal point would become located inside or close to the ocular lens system, thereby making it impossible to maintain an airspace sufficient for the reflection means.

By placing the negative lens $L_6$ on the eyepoint side of the positive lens $L_5$, a "reversed telephoto" configuration is achieved in the ocular lens system. Such a configuration makes it possible to reduce the focal length of the ocular lens system while maintaining an airspace between the objective and ocular lens systems sufficient for placement of the second reflection means in the airspace therebetween for erecting the image formed by the objective lens system.

By providing the negative lens $L_6$ with a meniscus shape, a wide principal-point space of both the positive lens $L_5$ and the negative lens $L_6$ can be maintained even though both lenses are situated close to each other. Thus, the focal length of the ocular lens system can be shortened without causing an increase in the effective diameter of the ocular lens system or an increase in the refractive power of each lens $L_5$, $L_6$.

In order to obtain a suitable Loupe magnification in this second group of embodiments, the following conditional expression is preferably satisfied:

$$0.5 < f_{123w}/f_e < 1.0 \quad (5)$$

wherein $f_{123w}$ is the composite magnification at the low-magnification end of the first lens group $G_1$, second lens group $G_2$, and the third lens group $G_3$; and $f_e$ is the focal length of the ocular lens system.

Falling below the lower limit of conditional expression (5) can result from $f_e$ being too large, and would reduce the advantage of larger Loupe magnification. Exceeding the upper limit of conditional expression (5) would cause $f_e$ to be too small for effectively reducing aberrations.

If the zoom ratio of the viewfinder is 2 or greater, including more than one lens in the second lens group $G_2$ can produce favorable correction of spherical aberration and coma. However, including more than one lens in the second lens group $G_2$ would undesirably increase the size of the viewfinder. Thus, the second lens group $G_2$ is preferably comprised of a single lens $L_2$. If the lens $L_2$ is aspherical only on the object-facing surface, spherical aberrations can be reduced to a level that would be exhibited if the second lens group $G_2$ were to comprise multiple lenses; but, external coma aberrations would still be present. Providing an aspherical surface also on the eyepoint-facing surface of the lens $L_2$ can result in the coma aberrations being internal coma. Thus, the second lens group $G_2$ preferably comprises a single lens $L_2$ that is aspherical on both refractive surfaces. Such a configuration effectively cancels cancel coma aberrations arising on either surface. Such a configuration also favorably corrects spherical aberrations in addition to coma aberrations if the aspherical surface distribution of both surfaces is in a suitable ratio. Preferably, each such aspherical surface exhibits a reduction in curvature with increasing lateral distance from the optical axis, and the sums of aspherical surface distributions at each lateral location are preferably the same.

If the zoom ratio is less than 2, favorable correction of spherical aberration and coma would still be possible if the second lens group $G_2$ comprised only a single lens $L_2$ (especially if the lens $L_2$ included at least one aspherical surface).

In view of the above, because correction of coma aberrations greatly depends on the aspherical surface profile of the positive lens $L_2$, it is preferred that the following conditional expression be satisfied to achieve favorable correction of coma aberrations:

$$0.2 < |S_2/S_1| < 0.4 \qquad (6)$$

wherein $S_1$ is the displacement amount in the axial direction as defined by equation (a), below, at a height of $y=|0.25r_3|$ from the optical axis at the aspherical lens surface on the object side of the lens L2; $S_2$ is a displacement amount in the axial direction as defined by equation (a) below at a height of $y=|0.25r_3|$ from the optical axis at the aspherical lens surface on the eyepoint side of the lens $L_2$; and $r_3$ is the paraxial curvature radius of the aspherical surface on the object side of the lens $L_2$.

At a height y above the optical axis, a displacement amount S(y) along the optical axis of the aspherical surface at height y, a normal curvature radius R, a conical coefficient κ, and an nth degree aspherical surface coefficient $C_n$, the shape of the aspherical lens surface is represented by the following equation:

$$S(y) = \frac{y^2/R}{1+\sqrt{1-\kappa \cdot y^2/R^2}} + \sum_{n=2} C_n \times |y^n| - \frac{y^2/r}{1+\sqrt{1-y^2/r^2}}$$

The paraxial curvature radius r is defined by the following conditional expression (b):

$$r=1/(2C_2-1/R) \qquad (b)$$

Exceeding the upper limit of conditional expression (6) would cause the aspherical character of the eyepoint-facing surface of the lens $L_2$ to be too large. The resulting internal coma would cause flare. Falling below the lower limit of conditional expression (6) would cause the aspherical character of the lens surface on the object side to be too large. The resulting external coma would render favorable correction of coma aberrations impossible.

With respect to the second group of embodiments, the following conditional expressions are also preferably satisfied:

$$1 < \beta_{34w} < 1.4 \qquad (7)$$

$$-0.4 < (r_1+r_2)/(r_1-r_2) < 0.2 \qquad (8)$$

wherein $\beta_{34w}$ is the composite magnification, at the low-magnification side, of the third lens group $G_3$ and the fourth lens group $G_4$; $r_1$ is the curvature radius of the lens surface on the object side of the negative lens $L_1$; and $r_2$ is the paraxial curvature radius of the lens surface on the eyepoint side of the negative lens $L_1$.

In embodiments that include the fourth lens group $G_4$, it is preferable for the combined magnification $\beta_{34}$ of the third lens group $G_3$ and the fourth lens group $G_4$ to be 1× or greater in order to achieve a suitably small size of the viewfinder. It is also preferred that conditional expression (7) be satisfied. Exceeding the upper limit of conditional expression (7) would cause the combined focal length of the first lens group $G_1$ and the second lens group $G_2$ to be decreased. But, because the necessary diameter of the exit pupil must be ensured, the aperture ratio between the first lens group $G_1$ and the second lens group $G_2$ would become larger, making correction of spherical aberrations especially difficult. To correct spherical aberrations, it is preferred that conditional expression (8) be satisfied.

Falling below the lower limit of conditional expression (7) would lessen the effect of the third lens group $G_3$, making it impossible to maximize the beneficial effect of the third and fourth lens groups as a rear converter. Exceeding the upper limit of conditional expression (7) would increase the aberrations imparted by the first and the second lens groups $G_1$, $G_2$ and thus make correcting those aberrations difficult. As a result, it would be impossible for each lens group $G_1$–$G_4$ to comprise only a single lens.

Conditional expression (8) pertains not only to spherical aberrations but also to distortion. Exceeding the upper limit of conditional expression (8) would necessitate an increase in the curvature radius of the lens surface on the object side of the negative lens $L_1$, with a correspondingly increased difficulty in correcting spherical aberrations. Falling below the lower limit of conditional expression (8) would result in the curvature radius of the object-facing lens surface of the first lens $L_1$ being too small, which would increase the difficulty of correcting distortion.

4. Example Embodiments 1–4

Figure 1:
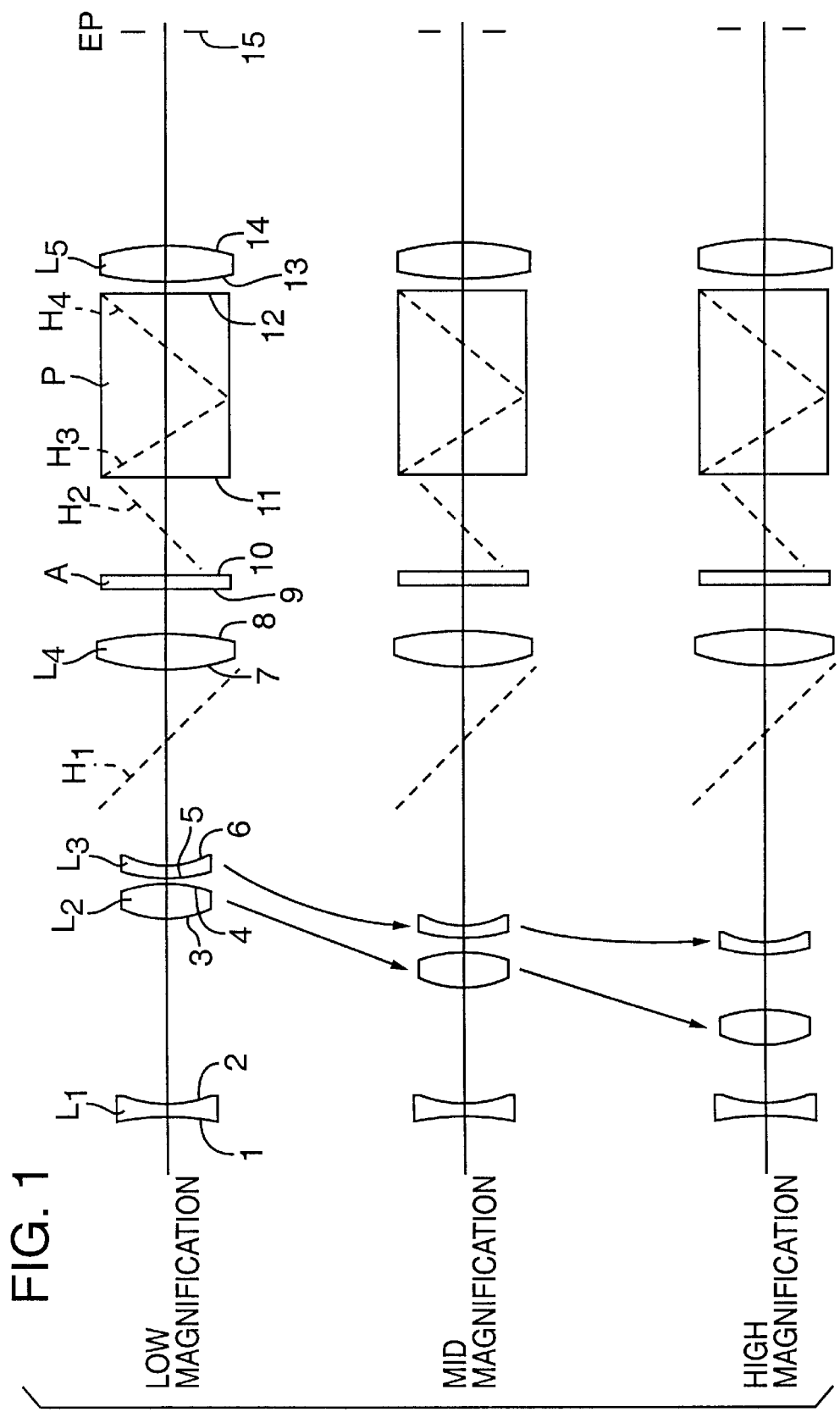
FIG. 1 is an optical diagram of a viewfinder according to Example Embodiment 1, showing lens positions for achieving magnification at the low-magnification end (top), a mid-magnification setting (middle), and the high-magnification end (bottom).
Figure 9:
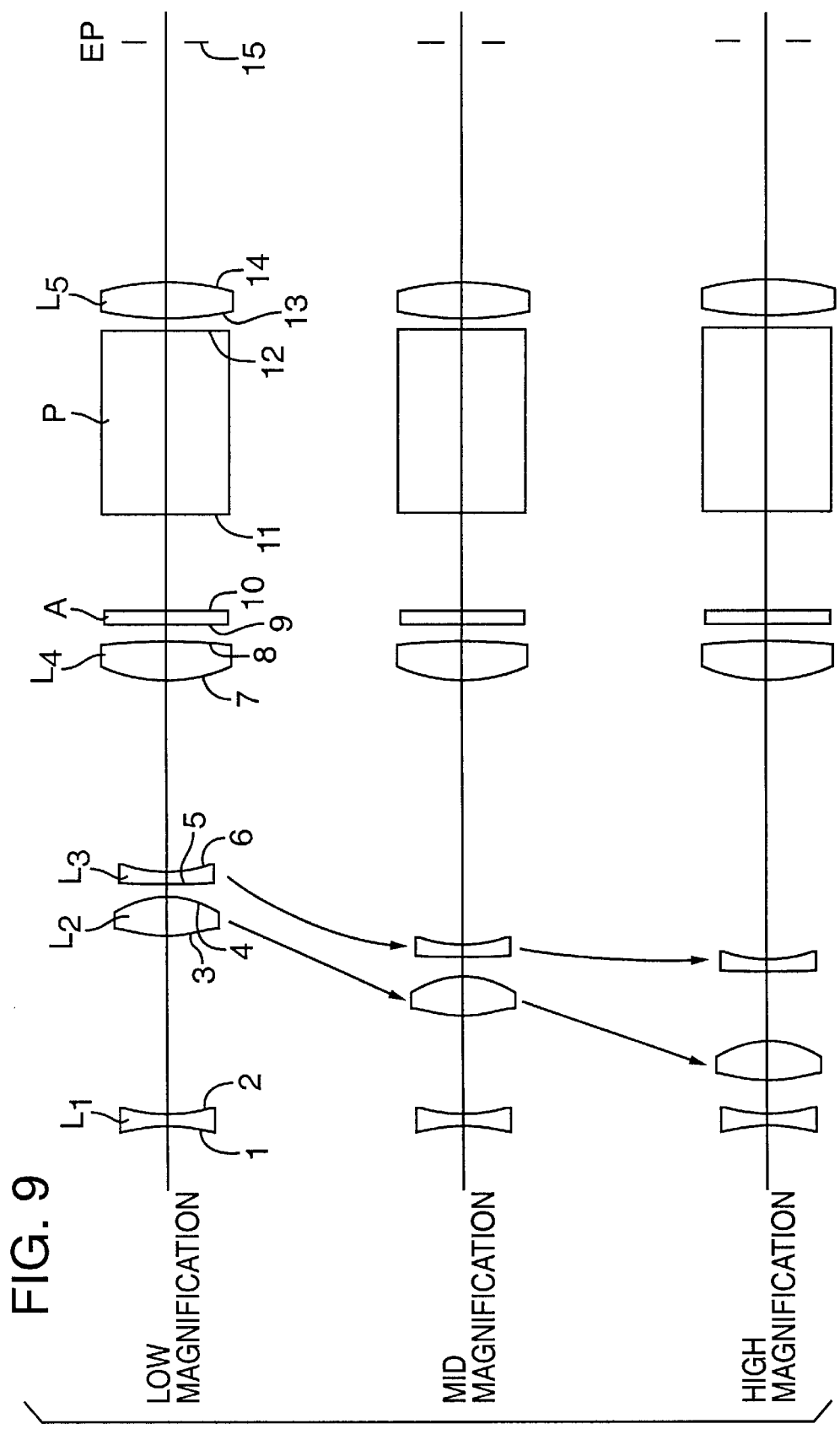
FIG. 9 is an optical diagram of a viewfinder according to Example Embodiment 3, showing lens positions for achieving magnification at the low-magnification end (top), a mid-magnification setting (middle), and the high-magnification end (bottom).

Example Embodiments 1–4 are exemplary of the first group of embodiments described above. Optical diagrams of Example Embodiments 1–4 are shown in FIGS. 1, 5, 9, and 13, respectively. Each of FIGS. 1, 5, 9, and 13 depicts the lens configurations in a lowest magnification state, a middle magnification state, and a highest magnification state. (The reflective surfaces $H_1$–$H_4$ are not shown in FIGS. 5, 9, and 13, but are placed in Example Embodiments 2–4 similarly to what is shown in FIG. 1.)

Each of these example embodiments comprises an objective lens system and an ocular lens system. Each objective lens system has an overall positive refractive power and comprises a first, second, third, and fourth lens group, in order from the object side. The first lens group $G_1$ comprises preferably a single negative lens $L_1$. The second lens group $G_2$ comprises preferably a single positive lens $L_2$. The third lens group $G_3$ comprises preferably a single negative lens $L_3$. The fourth lens group $G_4$ comprises preferably a single positive lens $L_4$. A mirror defining a first reflective surface $H_1$ is disposed in the airspace between the lens $L_3$ and the lens $L_4$. A glass parallel-planar plate A is disposed image-wise of the lens $L_4$ close to the image plane of the objective lens system. The plate A is used, e.g., for displaying a field-of-view frame or grid.

Second, third, and fourth reflective surfaces $H_2$, $H_3$, and $H_4$, respectively, are disposed on the eyepoint side of the image formed by the objective lens system. The second reflective surface $H_2$ is preferably defined by a mirror and the third and fourth reflective surfaces $H_3$, $H_4$, respectively, are preferably defined by a prism P. A positive ocular lens $L_5$ is disposed on the eyepoint side of the prism P. The ocular lens comprises a object-side lens surface that is preferably an aspherical surface. Each positive lens $L_2$, $L_4$, $L_5$ and the prism P are preferably made from an acrylic resin; each negative lens $L_1$, $L_3$ is preferably made from a polycarbonate resin.

In each example embodiment, the first lens group $G_1$, the reflective surfaces $H_1$–$H_4$, the flat plate A, and the lenses $L_1$, $L_4$, and $L_5$ are axially fixed in position. The second and third lens groups ($G_2$, $G_3$ are axially movable for zooming. When zooming from the low-magnification end to the high-magnification end, the second and third lens groups $G_2$, $G_3$ move toward the first lens group $G_1$, and the axial airspace between the second and third lens groups lengthens.

The following Tables 1–4 list physical data for Example Embodiments 1–4, respectively. In the tables, "m" denotes magnification, "X" denotes diopter, "2ω" denotes the field-of-view angle, "ER" denotes the eye relief (i.e., distance from eyepoint EP to the lens surface closest to the eyepoint EP) and "2H" denotes the pupil diameter. In the section of each table devoted to lens dimensions, the first column (labeled "No.") lists lens-surface numbers from the object side, the second column (labeled "r") lists respective curvature radii of the lens surfaces, the third column (labeled "d") lists the axial distance between adjacent optical surfaces, the fourth column (labeled "ν") lists respective Abbe numbers, the fifth column (labeled "n") lists respective refractive indices (for d-line light; λ=587.6 nm), and the sixth column lists respective lens numbers.

A * symbol in the first column denotes that the respective surface is aspherical. For an aspherical lens surface, r is the curvature radius at the optical axis. The shape of any such aspherical surface is defined by following equation:

$$X(y) = \frac{y^2/r}{1 + \sqrt{1 - \kappa \cdot y^2/r^2}} + \sum C_n \times |y^n|$$

wherein y is the lateral distance from the optical axis; X is the distance, in a direction along the optical axis, from the tangent plane to the aspherical surface; r is the curvature radius of the surface at the optical axis; κ is the conical constant; and $C_n$ is the nth degree aspherical surface coefficient. The conical constant K and the aspherical surface coefficient $C_n$ are shown in the "Aspherical Surface Data" section of each table. In the "Aspherical Surface Data", any aspherical surface coefficient $C_n$ not listed is zero (0).

Table 5 lists values for conditional expressions (1)–(3) for each example embodiment.

TABLE 1

(Example Embodiment 1)

Overall Characteristics m = 0.450 ~ 1.125  X = −1.00D
2ω = 56.5° ~ 20.8°  EP = 15.0  2H' = 4.0
Lens Data

| Surface No. | r | d | ν | n | Lens No. |
|---|---|---|---|---|---|
| 1 | −15.5788 | 1.0000 | 30.24 | 1.585180 | $L_1$ |
| 2* | 15.1272 | ($D_{12}$) | | | |
| 3* | 8.9329 | 2.6000 | 57.57 | 1.491080 | $L_2$ |
| 4* | −7.6236 | ($D_{23}$) | | | |
| 5 | 48.4787 | 1.0000 | 30.24 | 1.585180 | $L_3$ |
| 6 | 9.8203 | ($D_{34}$) | | | |
| 7* | 11.8661 | 2.7000 | 57.57 | 1.491080 | $L_4$ |
| 8 | −28.8226 | 3.6941 | | | |
| 9 | ∞ | 1.0000 | 58.80 | 1.522160 | A |
| 10 | ∞ | 8.3900 | | | |
| 11 | ∞ | 15.2400 | 33.59 | 1.571100 | P |
| 12 | ∞ | 1.0000 | | | |
| 13* | 20.3196 | 3.0000 | 57.57 | 1.491080 | $L_5$ |
| 14 | −20.3618 | 15.0000 | | | |
| 15 | Eyepoint | | | | |

Aspherical Surface Data

No. 2  κ = −2.8735  $C_2 = 0$    $C_4 = -1.48300 \times 10^{-4}$
              $C_6 = 2.73550 \times 10^{-5}$  $C_8 = -1.55920 \times 10^{-6}$
              $C_{10} = 2.86620 \times 10^{-8}$
No. 3  κ = −2.6547  $C_2 = 0$    $C_4 = -4.05220 \times 10^{-4}$
              $C_6 = -5.37000 \times 10^{-5}$  $C_8 = -1.28690 \times 10^{-7}$
              $C_{10} = -6.12470 \times 10^{-8}$  $C_{12} = -0.12190 \times 10^{-7}$
              $C_{14} = -0.81511 \times 10^{-9}$  $C_{16} = 0.51698 \times 10^{-11}$
No. 4  κ = 0.6589   $C_2 = 0$    $C_4 = 1.33460 \times 10^{-4}$
              $C_6 = -6.42370 \times 10^{-5}$  $C_8 = 3.72580 \times 10^{-6}$
              $C_{10} = -3.99010 \times 10^{-7}$
No. 7  κ = −2.5000  $C_2 = 0$
No. 13 κ = −3.3287  $C_2 = 0$

TABLE 1-continued (Example Embodiment 1)

Variable Distances

| | Magnification | | |
|---|---|---|---|
| Distance | 0.450 | 0.636 | 1.125 |
| $D_{12}$ | 11.98431 | 7.88953 | 2.38530 |
| $D_{23}$ | 0.91953 | 1.50549 | 5.28746 |
| $D_{34}$ | 14.36497 | 17.87379 | 19.59605 |

TABLE 2

(Example Embodiment 2)

Overall Characteristics m = 0.455 ~ 1.137  X = −1.00D
2ω = 55.1° ~ 21.0°  EP = 15.0  2H' = 4.0
Lens Data

| Surface No. | r | d | ν | n | Lens No. |
|---|---|---|---|---|---|
| 1 | −26.9599 | 1.0000 | 30.24 | 1.585180 | $L_1$ |
| 2* | 11.2349 | ($D_{12}$) | | | |
| 3* | 7.9065 | 2.9000 | 57.57 | 1.491080 | $L_2$ |
| 4 | −11.1076 | ($D_{23}$) | | | |
| 5 | 14.4166 | 1.0000 | 30.24 | 1.585180 | $L_3$ |
| 6 | 6.9057 | ($D_{34}$) | | | |
| 7* | 13.8863 | 3.0000 | 57.57 | 1.491080 | $L_4$ |
| 8 | −29.2272 | 3.8399 | | | |
| 9 | ∞ | 1.0000 | 58.80 | 1.522160 | A |
| 10 | ∞ | 8.3900 | | | |
| 11 | ∞ | 15.2400 | 33.59 | 1.571100 | P |
| 12 | ∞ | 1.0000 | | | |
| 13* | 20.3196 | 3.0000 | 57.57 | 1.491080 | $L_5$ |
| 14 | −20.3618 | 15.0000 | | | |
| 15 | Eyepoint | | | | |

Aspherical Surface Data

No. 2  κ = −0.2397  $C_2 = 0$    $C_4 = -3.15870 \times 10^{-6}$
              $C_6 = -1.16350 \times 10^{-5}$  $C_8 = 1.71080 \times 10^{-6}$
              $C_{10} = -5.18390 \times 10^{-8}$
No. 3  κ = −1.2752  $C_2 = 0$    $C_4 = -6.08760 \times 10^{-5}$
              $C_6 = 1.61720 \times 10^{-6}$  $C_8 = -5.08850 \times 10^{-7}$
              $C_{10} = 6.49250 \times 10^{-9}$  $C_{12} = 0.20560 \times 10^{-9}$
              $C_{14} = 0.75033 \times 10^{-10}$  $C_{16} = -0.12207 \times 10^{-10}$
No. 7  κ = −2.5000  $C_2 = 0$
No. 13 κ = −3.3287  $C_2 = 0$ Variable Distances

| | Magnification | | |
|---|---|---|---|
| Distance | 0.455 | 0.719 | 1.137 |
| $D_{12}$ | 15.68203 | 9.63273 | 4.68338 |
| $D_{23}$ | 0.40601 | 1.30287 | 5.69696 |
| $D_{34}$ | 16.47599 | 21.62843 | 23.18369 |

TABLE 3

(Example Embodiment 3)

Overall Characteristics $m = 0.450 \sim 1.350$    $X = -1.00D$
$2\omega = 57.6° \sim 17.5°$    $EP = 15.0$    $2H' = 4.0$

Lens Data

| Surface No. | r | d | ν | n | Lens No. |
|---|---|---|---|---|---|
| 1 | −16.3344 | 1.0000 | 30.24 | 1.585180 | $L_1$ |
| 2* | 15.2434 | ($D_{12}$) | | | |
| 3* | 8.9953 | 3.4000 | 57.57 | 1.491080 | $L_2$ |
| 4* | −8.3508 | ($D_{23}$) | | | |
| 5 | 678.5465 | 1.0000 | 30.24 | 1.585180 | $L_3$ |
| 6* | 13.5492 | ($D_{34}$) | | | |
| 7* | 11.6282 | 3.3000 | 57.57 | 1.491080 | $L_4$ |
| 8 | −48.7385 | 1.4069 | | | |
| 9 | ∞ | 1.0000 | 58.80 | 1.522160 | A |
| 10 | ∞ | 8.3900 | | | |
| 11 | ∞ | 15.2400 | 33.59 | 1.571100 | P |
| 12 | ∞ | 1.0000 | | | |
| 13* | 20.3196 | 3.0000 | 57.57 | 1.49180 | $L_5$ |
| 14 | −20.3618 | 15.0000 | | | |
| 15 | Eyepoint | | | | |

Aspherical Surface Data

No. 2   $\kappa = 0.4865$   $C_2 = 0$   $C_4 = -6.29090 \times 10^{-6}$
     $C_6 = 5.44060 \times 10^{-7}$   $C_8 = 1.26030 \times 10^{-7}$
     $C_{10} = -6.40290 \times 10^{-9}$ No. 3   $\kappa = -2.0127$   $C_2 = 0$   $C_4 = -7.64130 \times 10^{-5}$
     $C_6 = 2.52810 \times 10^{-5}$   $C_8 = 3.59710 \times 10^{-7}$
     $C_{10} = 1.06520 \times 10^{-8}$   $C_{12} = -0.34876 \times 10^{-8}$
     $C_{14} = -0.27628 \times 10^{-9}$   $C_{16} = 0.10165 \times 10^{-10}$ No. 4   $\kappa = -3.0000$   $C_2 = 0$   $C_4 = -7.42100 \times 10^{-4}$
     $C_6 = -1.11410 \times 10^{-5}$   $C_8 = 9.50190 \times 10^{-7}$
     $C_{10} = -1.23400 \times 10^{-7}$ No. 6   $\kappa = 9.5522$   $C_{2-0}$   $C_4 = -3.43740 \times 10^{-4}$
     $C_6 = -1.21120 \times 10^{-5}$   $C_8 = 1.29170 \times 10^{-6}$
     $C_{10} = -9.08130 \times 10^{-8}$ No. 7   $\kappa = -2.5000$   $C_2 = 0$
No. 13   $\kappa = -3.3287$   $C_2 = 0$

Variable Distances

| | Magnification | | |
|---|---|---|---|
| Distance | 0.450 | 0.779 | 1.350 |
| $D_{12}$ | 15.02375 | 8.07125 | 2.54996 |
| $D_{23}$ | 1.03605 | 1.66367 | 5.92033 |
| $D_{34}$ | 15.98090 | 22.30579 | 23.57041 |

TABLE 4

(Example Embodiment 4)

Overall Characteristics $m = 0.355 \sim 1.888$    $X = -1.00D$
$2\omega = 66.4° \sim 26.7°$    $EP = 15.0$    $2H' = 4.0$

Lens Data

| Surface No. | r | d | ν | n | Lens No. |
|---|---|---|---|---|---|
| 1 | 40.9199 | 1.0000 | 30.24 | 1.585180 | $L_1$ |
| 2* | 6.7935 | ($D_{12}$) | | | |
| 3* | 8.4089 | 2.9000 | 57.57 | 1.491080 | $L_2$ |
| 4* | −11.4801 | ($D_{23}$) | | | |
| 5 | 15.1064 | 1.0000 | 30.24 | 1.585180 | $L_3$ |
| 6* | 7.5339 | ($D_{34}$) | | | |
| 7* | 13.8519 | 3.0000 | 57.57 | 1.491080 | $L_4$ |
| 8 | −23.8545 | 4.8232 | | | |
| 9 | ∞ | 1.0000 | 58.80 | 1.522160 | A |
| 10 | ∞ | 8.3900 | | | |
| 11 | ∞ | 15.2400 | 33.59 | 1.571100 | P |
| 12 | ∞ | 1.0000 | | | |
| 13* | 20.3196 | 3.0000 | 57.57 | 1.491080 | $L_5$ |
| 14 | −20.3618 | 15.0000 | | | |
| 15 | Eyepiece | | | | |

Aspherical Surface Data

No. 2   $\kappa = 0.6376$   $C_2 = 0$   $C_4 = -3.00350 \times 10^{-6}$
     $C_6 = 1.16010 \times 10^{-5}$   $C_{8-} = -7.39010 \times 10^{-7}$
     $C_{10} = 1.45850 \times 10^{-8}$ No. 3   $\kappa = -0.9362$   $C_2 = 0$   $C_{4-} = 3.01460 \times 10^{-5}$
     $C_6 = -1.81910 \times 10^{-5}$   $C_8 = -1.39020 \times 10^{-7}$
     $C_{10} = 4.84820 \times 10^{-8}$   $C_{12} = -0.65461 \times 10^{-8}$
     $C_{14} = -0.87973 \times 10^{-9}$   $C_{16} = 0.88788 \times 10^{-10}$ No. 4   $\kappa = 0.3652$   $C_2 = 0$   $C_4 = -1.06030 \times 10^{-4}$
     $C_6 = -2.39470 \times 10^{-5}$   $C_8 = 1.41230 \times 10^{-7}$
     $C_{10} = -1.09140 \times 10^{-7}$ No. 6   $\kappa = 2.0080$   $C_2 = 0$
No. 7   $\kappa = -2.5000$   $C_2 = 0$
No. 13   $\kappa = -3.3287$   $C_2 = 0$

Variable Distances

| | Magnification | | |
|---|---|---|---|
| Distance | 0.355 | 0.562 | 0.888 |
| $D_{12}$ | 18.32615 | 11.90344 | 6.44245 |
| $D_{23}$ | 1.00086 | 1.03713 | 3.67788 |
| $D_{34}$ | 11.07766 | 17.46409 | 20.28434 |

TABLE 5

(Example Embodiments 1–4)

| | Example Embodiment | | | |
|---|---|---|---|---|
| Characteristic | 1 | 2 | 3 | 4 |
| (1) $(D_{12W} + D_{23W})/(D_{12T} + D_{23T})$ | 1.682 | 1.715 | 1.896 | 1.910 |
| $D_{12W}$ | 11.984 | 15.682 | 15.024 | 18.326 |
| $D_{23W}$ | 0.920 | 0.406 | 1.036 | 1.001 |
| $D_{12T}$ | 2.385 | 4.683 | 2.550 | 6.442 |
| $D_{23T}$ | 5.287 | 4.697 | 5.920 | 3.678 |
| (2) $\|f_3/f_2\|$ | 2.406 | 2.406 | 2.508 | 2.601 |
| $f_2$ | 8.833 | 9.903 | 9.427 | 10.382 |
| $f_3$ | −21.248 | −23.822 | −23.639 | −27.000 |
| (3) $\beta_{234T}$ | −1.833 | −1.788 | −2.140 | −1.332 |

FIGS. 2(a), 3(a), and 4(a) are plots of spherical aberrations for the lowest-magnification setting, the middle-magnification setting, and the highest-magnification setting for Example Embodiment 1. Similarly, FIGS. 6(a), 7(a), and 8(a) are plots of spherical aberrations for the lowest-magnification setting, the middle-magnification setting, and the highest-magnification setting for Example Embodiment 2; FIGS. 10(a), 11(a), and 12(a) are plots of spherical aberrations for the lowest-magnification setting, the middle-magnification setting, and the highest-magnification setting for Example Embodiment 3; and FIGS. 14(a), 15(a), and 16(a) are plots of spherical aberrations for the lowest-magnification setting, the middle-magnification setting, and the highest-magnification setting for Example Embodiment 4.

FIGS. 2(b), 3(b), and 4(b) are plots of astigmatism for the lowest-magnification setting, the middle-magnification setting, and the highest-magnification setting for Example Embodiment 1. Similarly, FIGS. 6(b), 7(b), and 8(b) are plots of astigmatism for the lowest-magnification setting, the middle-magnification setting, and the highest-magnification setting for Example Embodiment 2; FIGS. 10(b), 11(b), and 12(b) are plots of astigmatism for the lowest-magnification setting, the middle-magnification setting, and the highest-magnification setting for Example Embodiment 3; and FIGS. 14(b), 15(b), and 16(b) are plots of astigmatism for the lowest-magnification setting, the middle-magnification setting, and the highest-magnification setting for Example Embodiment 4.

FIGS. 2(c), 3(c), and 4(c) are plots of distortion for the lowest-magnification setting, the middle-magnification setting, and the highest-magnification setting for Example Embodiment 1. Similarly, FIGS. 6 (c), 7(c), and 8(c) are plots of distortion for the lowest-magnification setting, the middle-magnification setting, and the highest-magnification setting for Example Embodiment 2; FIGS. 10(c), 11(c), and 12(c) are plots of distortion for the lowest-magnification setting, the middle-magnification setting, and the highest-magnification setting for Example Embodiment 3; and FIGS. 14(c), 15(c), and 16(c) are plots of distortion for the lowest-magnification setting, the middle-magnification setting, and the highest-magnification setting for Example Embodiment 4.

FIGS. 2(d), 3(d), and 4(d) are plots of lateral aberrations for the lowest-magnification setting, the middle-magnification setting, and the highest-magnification setting for Example Embodiment 1. Similarly, FIGS. 6(d), 7(d), and 8(d) are plots of lateral aberration for the lowest-magnification setting, the middle-magnification setting, and the highest-magnification setting for Example Embodiment 2; FIGS. 10(d), 11(d), and 12(d) are plots of lateral aberration for the lowest-magnification setting, the middle-magnification setting, and the highest-magnification setting for Example Embodiment 3; and FIGS. 14(d), 15(d), and 16(d) are plots of lateral aberration for the lowest-magnification setting, the middle-magnification setting, and the highest-magnification setting for Example Embodiment 4.

FIGS. 2(e), 3(e), and 4(e) are plots of magnification chromatic aberrations for the lowest-magnification setting, the middle-magnification setting, and the highest-magnification setting for Example Embodiment 1. Similarly, FIGS. 6(e), 7(e), and 8(e) are plots of magnification chromatic aberration for the lowest-magnification setting, the middle-magnification setting, and the highest-magnification setting for Example Embodiment 2; FIGS. 10(e), 11(e), and 12(e) are plots of magnification chromatic aberration for the lowest-magnification setting, the middle-magnification setting, and the highest-magnification setting for Example Embodiment 3; and FIGS. 14(e), 15(e), and 16(e) are plots of magnification chromatic aberration for the lowest-magnification setting, the middle-magnification setting, and the highest-magnification setting for Example Embodiment 4.

In the aberration plots, H is the incident height and $\omega$ is the half-angle of the field of view. In the plots of astigmatism, solid curves represent the sagittal image plane and dashed curves represent the meridional image plane.

As is clearly seen from each aberration plot, excellent imaging performance is exhibited by each of Example Embodiments 1–4.

5. Example Embodiments 5–8

Figure 17:
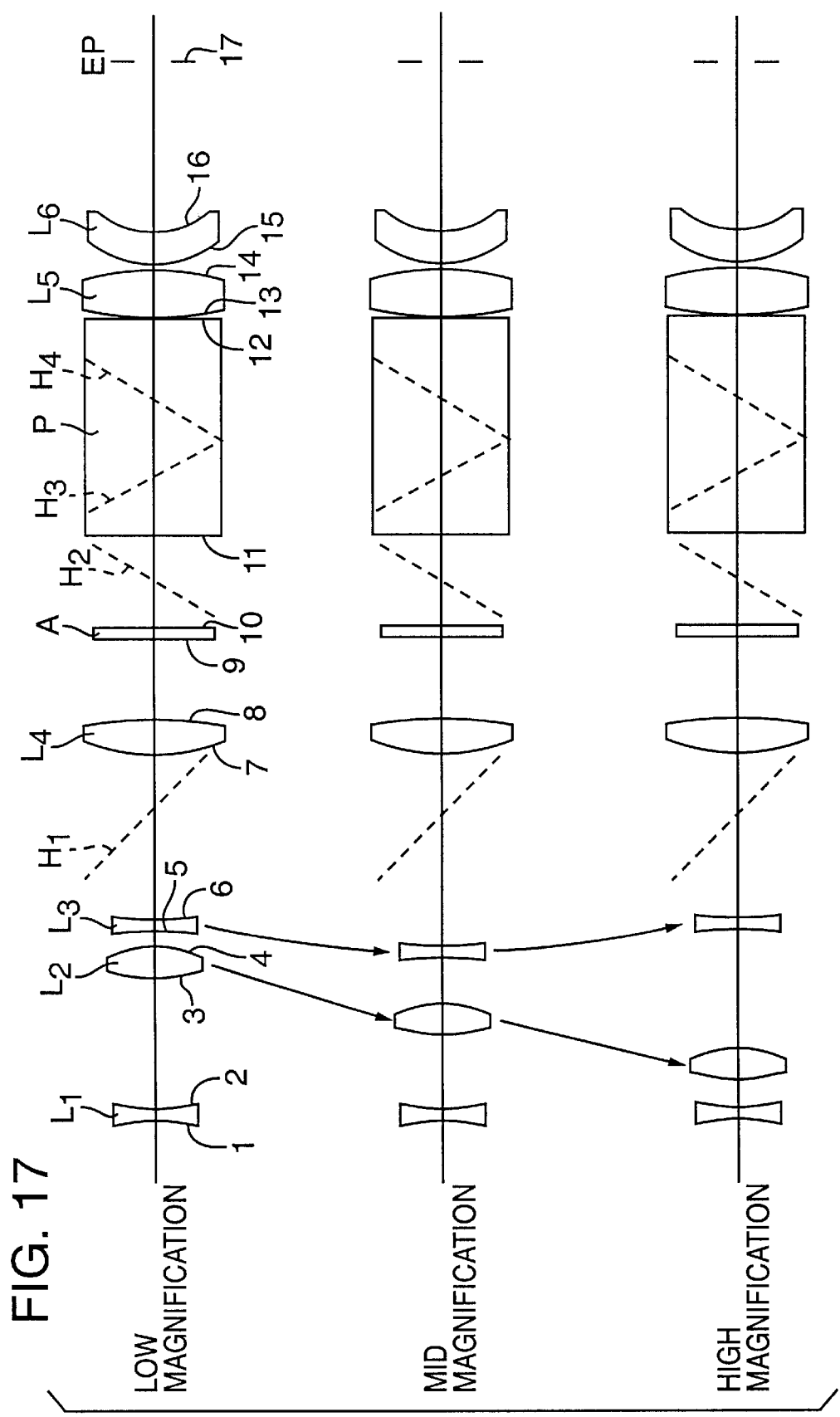
FIG. 17 is an optical diagram of a viewfinder according to Example Embodiment 5, showing lens positions for achieving magnification at the low-magnification end (top), a mid-magnification setting (middle), and the high-magnification end (bottom).

Example Embodiments 5–8 are exemplary of the second group of embodiments described above. Optical diagrams of Example Embodiments 5–8 are shown in FIGS. 17, 21, 25, and 29, respectively. Each of FIGS. 17, 21, 25, and 29 depicts the lens configurations in a lowest magnification state, a middle magnification state, and a highest magnification state. (The reflective surfaces $H_1$–$H_4$ are not shown in FIGS. 21, 25, and 29, but are placed in Example Embodiments 5–8 similarly to what is shown in FIG. 17.)

Each of these example embodiments comprises an objective lens system and an ocular lens system. Each objective lens system has an overall positive refractive power and comprises a first, second, third, and fourth lens group, in order from the object side. The first lens group $G_1$ comprises preferably a single negative lens $L_1$. The second lens group $G_2$ comprises preferably a single positive lens $L_2$. The third lens group $G_3$ comprises preferably a single negative lens $L_3$. The fourth lens group $G_4$ comprises preferably a single positive lens $L_4$. A mirror defining a first reflective surface $H_1$ is disposed in the airspace between the lens $L_3$ and the lens $L_4$. A glass parallel-planar plate A is disposed imagewise of the lens $L_4$ close to the image plane of the objective lens system. The plate A is used, e.g., for displaying a field-of-view frame or grid.

Second, third, and fourth reflective surfaces $H_2$, $H_3$, and $H_4$, respectively, are disposed on the eyepoint side of the image formed by the objective lens system. The second reflective surface $H_2$ is preferably defined by a mirror and the third and fourth reflective surfaces $H_3$, $H_4$, respectively, are preferably defined by a prism P. A positive ocular lens $L_5$ is disposed on the eyepoint side of the prism P. The ocular lens comprises a object-side lens surface that is preferably an aspherical surface. Each positive lens $L_2$, $L_4$, $L_5$ is preferably made from an acrylic resin; each negative lens $L_1$, $L_3$ is preferably made from a polycarbonate resin. The prism P can be made of an acrylic resin, a polyolefin resin (as used in Example Embodiments 5 and 6), or MAS resin (as used in Example Embodiments 7 and 8).

In Example Embodiments 5 and 8, the first lens group $G_1$ and the fourth lens group $G_4$ are axially fixed in position, and the second and third lens groups $G_2$, $G_3$ are axially movable for zooming. With such a configuration, when zooming from the low-magnification end to the high-magnification end, the second and third lens groups move toward the first lens group and the axial airspace between the second and third lens groups lengthens.

In Example Embodiments 6 and 7, the third lens group $G_3$ and the fourth lens group $G_4$ are axially fixed in position, and the first and second lens groups $G_1$, $G_3$ are axially movable for zooming. With such a configuration, when zooming from the low-magnification end to a mid-magnification setting, the first lens group $G_1$ moves imagewise, and the second lens group $G_2$ moves objectwise away from the third lens group $G_3$ (i.e., the axial airspace between the second and third lens groups increases in length). When zooming from the mid-magnification setting to the high-magnification end, the first lens group $G_1$ moves objectwise, and the second lens group moves objectwise away from the third lens group $G_3$ (i.e., both the first and second lens groups move away from the third lens group and the first and second lens groups move close together).

The following Tables 6–9 list physical data for Example Embodiments 5–8, respectively. In the tables, "m" denotes magnification, "X" denotes diopter, "2$\omega$" denotes the field-of-view angle, "ER" denotes the eye relief (i.e., distance from eyepoint EP to the lens surface closest to the eyepoint EP) and "2H'" denotes the pupil diameter. In the section of each table devoted to lens dimensions, the first column (labeled "No.") lists lens-surface numbers from the object side, the second column (labeled "r") lists respective curvature radii of the lens surfaces, the third column (labeled "d") lists the axial distance between adjacent optical surfaces, the fourth column (labeled "ν") lists respective Abbe numbers, the fifth column (labeled "n") lists respective refractive indices (for d-line light; λ=587.6 nm), and the sixth column lists respective lens numbers.

A * symbol in the first column denotes that the respective surface is aspherical. For an aspherical lens surface, r is the curvature radius at the optical axis. The shape of any such aspherical surface is defined by following equation:

$$X(y) = \frac{y^2/r}{1 + \sqrt{1 - \kappa \cdot y^2/r^2}} + \sum C_n \times |y^n|$$

wherein y is the lateral distance from the optical axis; X is the distance, in a direction along the optical axis, from the tangent plane to the aspherical surface; r is the curvature radius of the surface at the optical axis; κ is the conical constant; and $C_n$ is the nth degree aspherical surface coefficient. The conical constant κ and the aspherical surface coefficient $C_n$ are shown in the "Aspherical Surface Data" section of each table. In the "Aspherical Surface Data", any aspherical surface coefficient $C_n$ not listed is zero (0).

Table 10 lists values for conditional expressions (1)–(3) for each example embodiment.

TABLE 6

(Example Embodiment 5)

Overall Characteristics m = 0.504 ~ 1.259  X = -1.00D
2ω = 55° ~ 20.2°   EP = 12.0   2H' = 4.0
                   Lens Data

| Surface No. | r | d | ν | n | Lens Group |
|---|---|---|---|---|---|
| 1 | -13.9013 | 1.0000 | 30.24 | 1.585180 | $L_1$ |
| 2* | 13.4056 | ($D_{12}$) | | | |
| 3* | 8.7832 | 2.8000 | 57.57 | 1.491080 | $L_2$ |
| 4* | -8.4943 | ($D_{23}$) | | | |
| 5 | -25.5385 | 1.0000 | 30.24 | 1.585180 | $L_3$ |
| 6 | 25.2715 | ($D_{34}$) | | | |
| 7* | 12.5173 | 3.0000 | 57.57 | 1.491080 | $L_4$ |
| 8 | -35.8950 | 6.9780 | | | |
| 9 | ∞ | 1.0000 | 58.80 | 1.522160 | A |
| 10 | ∞ | 7.8000 | | | |
| 11 | ∞ | 18.6000 | 50.97 | 1.525000 | P |
| 12 | ∞ | 0.1000 | | | |
| 13* | 22.0718 | 4.0000 | 57.57 | 1.491080 | $L_5$ |
| 14 | -18.9403 | 0.5000 | | | |
| 15 | 8.2403 | 2.9000 | 30.24 | 1.585180 | $L_6$ |
| 16 | 6.8958 | 12.0000 | | | |
| 17 | Eyepoint | | | | |

Aspherical Surface Data

No = 2  κ = -0.6022  $C_2 = 0$         $C_4 = 1.17980 \times 10^{-4}$
                    $C_6 = -7.23700 \times 10^{-5}$  $C_8 = 8.59290 \times 10^{-6}$
                    $C_{10} = -3.50840 \times 10^{-7}$
No = 3  κ = -2.1612  $C_2 = 0$         $C_4 = 4.49670 \times 10^{-5}$
                    $C_6 = -2.71840 \times 10^{-6}$  $C_8 = -7.75240 \times 10^{-7}$
                    $C_{10} = -6.19640 \times 10^{-8}$  $C_{12} = -0.23853 \times 10^{-8}$
                    $C_{14} = 0.38816 \times 10^{-9}$  $C_{16} = -0.41806 \times 10^{-11}$
No = 4  κ = 0.6167   $C_2 = 0$         $C_4 = 6.46980 \times 10^{-6}$
                    $C_6 = 3.61470 \times 10^{-5}$  $C_8 = -4.47530 \times 10^{-6}$
                    $C_{10} = 1.03840 \times 10^{-7}$
No = 7  κ = -2.5000  $C_2 = 0$
No = 13 κ = -5.8607  $C_2 = 0$         $C_4 = 8.81390 \times 10^{-6}$
                    $C_6 = -4.32120 \times 10^{-7}$  $C_8 = 1.77950 \times 10^{-9}$
                    $C_{10} = 1.15690 \times 10^{-11}$ TABLE 6-continued (Example Embodiment 5)

Variable Distances

| | Magnification | | |
|---|---|---|---|
| Distance | 0.504 | 0.796 | 1.259 |
| $D_{12}$ | 11.15878 | 6.18140 | 2.3452 |
| $D_{23}$ | 1.27227 | 3.89338 | 10.0798 |
| $D_{34}$ | 14.30072 | 16.65700 | 14.30673 |

TABLE 7

(Example Embodiment 6)

Overall Characteristics m = 0.503 ~ 1.259  X = -1.00D
2ω = 55° ~ 20.2°   EP = 12.0   2H' = 4.0
                   Lens Data

| Surface No. | r | d | ν | n | Lens Group |
|---|---|---|---|---|---|
| 1 | -13.9013 | 1.0000 | 30.24 | 1.585180 | $L_1$ |
| 2* | 13.4056 | ($D_{12}$) | | | |
| 3* | 8.7832 | 2.8000 | 57.57 | 1.491080 | $L_2$ |
| 4* | -8.4943 | ($D_{23}$) | | | |
| 5 | -25.5385 | 1.0000 | 30.24 | 1.585180 | $L_3$ |
| 6 | 25.2715 | 14.3007 | | | |
| 7* | 12.5173 | 3.0000 | 57.57 | 1.491080 | $L_4$ |
| 8 | -35.8950 | 6.9779 | | | |
| 9 | ∞ | 1.0000 | 58.80 | 1.522160 | A |
| 10 | ∞ | 7.8000 | | | |
| 11 | ∞ | 18.6000 | 50.97 | 1.52500 | P |
| 12 | ∞ | 0.1000 | | | |
| 13* | 16.9184 | 4.0000 | 57.57 | 1.491080 | $L_5$ |
| 14 | -21.0490 | 0.5000 | | | |
| 15 | 10.0000 | 2.9000 | 30.24 | 1.585180 | $L_6$ |
| 16 | 8.0118 | 12.0000 | | | |
| 17 | Eyepoint | | | | |

Aspherical Surface Data

No = 2  κ = -0.6022  $C_2 = 0$         $C_4 = 1.17980 \times 10^{-4}$
                    $C_6 = -7.23700 \times 10^{-5}$  $C_8 = 8.59290 \times 10^{-6}$
                    $C_{10} = -3.50840 \times 10^{-7}$
No = 3  κ = -2.1621  $C_2 = 0$         $C_4 = 4.49670 \times 10^{-5}$
                    $C_6 = -2.71840 \times 10^{-6}$  $C_8 = -7.75240 \times 10^{-7}$
                    $C_{10} = -6.19640 \times 10^{-8}$  $C_{12} = -0.23853 \times 10^{-8}$
                    $C_{14} = 0.38816 \times 10^{-9}$  $C_{16} = -0.41806 \times 10^{-11}$
No = 4  κ = 0.6167   $C_2 = 0$         $C_4 = 6.46980 \times 10^{-6}$
                    $C_6 = 3.61470 \times 10^{-5}$  $C_8 = -4.47530 \times 10^{-6}$
                    $C_{10} = 1.03840 \times 10^{-7}$
No = 7  κ = -2.5000  $C_2 = 0$
No = 13 κ = -5.0907  $C_2 = 0$         $C_4 = 6.88710 \times 10^{-5}$
                    $C_6 = 1.64040 \times 10^{-7}$  $C_8 = -4.16930 \times 10^{-8}$
                    $C_{10} = 6.57230 \times 10^{-10}$ Variable Distances

| | Magnification | | |
|---|---|---|---|
| Distance | 0.503 | 0.796 | 1.259 |
| $D_{12}$ | 11.15878 | 5.75949 | 2.34452 |
| $D_{23}$ | 1.27227 | 4.68552 | 10.08259 |

TABLE 8

(Example Embodiment 7)

Overall Characteristics m = 0.508 ~ 0.893  X = −1.00D
2ω = 54.7° ~ 29.0°  EP = 12.0  2H' = 8.0

Lens Data

| Surface No. | r | d | ν | n | Lens Group |
|---|---|---|---|---|---|
| 1 | −10.2693 | 1.0000 | 30.24 | 1.585180 | $L_1$ |
| 2* | 17.7496 | ($D_{12}$) | | | |
| 3* | 7.9334 | 3.4650 | 57.57 | 1.491080 | $L_2$ |
| 4* | −7.2651 | ($D_{23}$) | | | |
| 5 | 17.6678 | 1.0000 | 30.24 | 1.585180 | $L_3$ |
| 6 | 9.2991 | 12.6785 | | | |
| 7* | 10.4096 | 3.0000 | 57.57 | 1.491080 | $L_4$ |
| 8 | −21.4859 | 1.1359 | | | |
| 9 | ∞ | 1.0000 | 58.80 | 1.522160 | A |
| 10 | ∞ | 7.8000 | | | |
| 11 | ∞ | 18.6000 | 33.59 | 1.571100 | P |
| 12 | ∞ | 0.1000 | | | |
| 13* | 10.7899 | 3.6000 | 57.57 | 1.491080 | $L_5$ |
| 14 | −23.4729 | 0.5000 | | | |
| 15 | 12.0000 | 1.9000 | 30.24 | 1.585180 | $L_6$ |
| 16 | 7.8978 | 12.0000 | | | |
| 17 | Eyepoint | | | | |

Aspherical Surface Data

No = 2  κ = −12.3843  $C_2 = 0$  $C_4 = -2.77320 \times 10^{-5}$
$C_6 = 1.78890 \times 10^{-5}$  $C_8 = 2.99910 \times 10^{-6}$
$C_{10} = 1.87590 \times 10^{-7}$ No = 3  κ = −5.8798  $C_2 = 0$  $C_4 = 2.35140 \times 10^{-4}$
$C_6 = 1.86890 \times 10^{-4}$  $C_8 = -5.64460 \times 10^{-5}$
$C_{10} = 7.20110 \times 10^{-6}$  $C_{12} = -0.40422 \times 10^{-6}$
$C_{14} = -0.19716 \times 10^{-8}$  $C_{16} = 0.82776 \times 10^{-9}$ No = 4  κ = 3.8100  $C_2 = 0$  $C_4 = 9.82700 \times 10^{-4}$
$C_6 = 1.54570 \times 10^{-4}$  $C_8 = -1.62210 \times 10^{-5}$
$C_{10} = 1.10500 \times 10^{-6}$ No = 7  κ = −2.5000  $C_2 = 0$
No = 13  κ = −1.2349  $C_2 = 0$  $C_4 = 6.00690 \times 10^{-5}$
$C_6 = 6.23930 \times 10^{-7}$  $C_8 = -5.73290 \times 10^{-8}$
$C_{10} = 1.10500 \times 10^{-10}$ Variable Distances

| | Magnification | | |
|---|---|---|---|
| Distance | 0.508 | 0.684 | 0.893 |
| $D_{12}$ | 6.87908 | 4.00615 | 2.05170 |
| $D_{23}$ | 1.13450 | 3.27814 | 5.83971 |

TABLE 9

(Example Embodiment 8)

Overall Characteristics m = 0.508~0.893  X = −1.00 D
2ω = 54.7°~28.9°  EP = 12.0  2H' = 8.0

Lens Data

| Surface No. | r | d | ν | n | Lens Group |
|---|---|---|---|---|---|
| 1 | −10.2693 | 1.0000 | 30.24 | 1.585180 | $L_1$ |
| 2* | 17.7496 | ($D_{12}$) | | | |
| 3* | 7.9334 | 3.4650 | 57.57 | 1.491080 | $L_2$ |
| 4 | −7.2651 | ($D_{23}$) | | | |
| 5 | 17.6678 | 1.0000 | 30.24 | 1.585180 | $L_3$ |
| 6 | 9.2991 | ($D_{34}$) | | | |
| 7* | 10.4096 | 3.0000 | 57.57 | 1.491080 | $L_4$ |
| 8 | −21.4860 | 1.1359 | | | |
| 9 | ∞ | 1.0000 | 58.80 | 1.522160 | A |
| 10 | ∞ | 7.8000 | | | |
| 11 | ∞ | 18.6000 | 33.59 | 1.571100 | P |
| 12 | ∞ | 0.1000 | | | |
| 13* | 12.3906 | 3.6000 | 57.57 | 1.491080 | $L_5$ |
| 14 | −23.2020 | 0.5000 | | | |
| 15 | 11.0000 | 2.3000 | 30.24 | 1.585180 | $L_6$ |
| 16 | 7.8978 | 12.0000 | | | |
| 17 | Eyepoint | | | | |

Aspherical Surface Data

No = 2  κ = −12.3843  $c_2 = 0$  $c_4 = -2.77320 \times 10^{-5}$
$c_6 = 1.78890 \times 10^{-5}$  $c_8 = -2.99910 \times 10^{-6}$
$c_{10} = 1.87590 \times 10^{-7}$ No = 3  κ = −5.8798  $c_2 = 0$  $c_4 = 2.35140 \times 10^{-4}$
$c_6 = 1.86890 \times 10^{-4}$  $c_8 = -5.64460 \times 10^{-5}$
$c_{10} = 7.20110 \times 10^{-6}$  $c_{12} = -0.40422 \times 10^{-6}$
$c_{14} = -0.19716 \times 10^{-8}$  $c_{16} = 0.82776 \times 10^{-9}$ No = 4  κ = 3.8100  $c_2 = 0$  $c_4 = 9.82700 \times 10^{-4}$
$c_6 = 1.54570 \times 10^{-4}$  $c_8 = 1.62210 \times 10^{-5}$
$c_{10} = 1.10500 \times 10^{-06}$ No = 7  κ = −2.5000  $c_2 = 0$
No = 13  κ = −1.4940  $c_2 = 0$  $c_4 = 3.86830 \times 10^{-5}$
$c_6 = 7.83290 \times 10^{-7}$  $c_8 = -5.15100 \times 10^{-8}$
$c_{10} = 7.13470 \times 10^{-10}$ Variable Distances

| | Magnification | | |
|---|---|---|---|
| Distance | 0.508 | 0.684 | 0.893 |
| $D_{12}$ | 6.87908 | 4.22846 | 2.08685 |
| $D_{23}$ | 1.13449 | 2.43070 | 5.64693 |
| $D_{34}$ | 12.67853 | 14.03294 | 12.95832 |

TABLE 10

(Example Embodiments 5–8)

| Characteristics | | Example Embodiment | | | |
|---|---|---|---|---|---|
| | | 5 | 6 | 7 | 8 |
| (1) | $f_3/f_5$ | −1.005 | −1.089 | −2.251 | −2.063 |
| | $f_3$ | −21.550 | −21.550 | −35.097 | −35.097 |
| | $f_5$ | 21.446 | 19.786 | 15.592 | 17.015 |
| 1(2) | $f_{123w}/f_e$ | 0.898 | 0.898 | 0.613 | 0.613 |
| | $f_{123w}$ | 17.519 | 17.519 | 11.826 | 11.826 |
| | $f_e$ | 19.5 | 19.5 | 19.3 | 19.3 |
| (3) | $|s_2/s_1|$ | 0.306 | 0.306 | 0.262 | 0.262 |
| | $s_1$ | −0.014 | −0.014 | −0.017 | −0.017 |
| | $s_2$ | 0.004 | 0.004 | 0.004 | 0.004 |
| (4) | $\beta_{34w}$ | 1.347 | 1.347 | 1.198 | 1.198 |
| (5) | $(r_1 + r_2)/(r_1 - r_2)$ | 0.018 | 0.018 | −0.267 | −0.267 |
| | $r_1$ | −13.901 | −13.901 | −10.269 | −10.269 |
| | $r_2$ | 13.406 | 13.406 | 17.750 | 17.750 |

FIGS. 18(*a*), 19(*a*), and 19(*a*) are plots of spherical aberrations for the lowest-magnification setting, the middle-magnification setting, and the highest-magnification setting for Example Embodiment 5. Similarly, FIGS. 22(*a*), 23(*a*), and 24(*a*) are plots of spherical aberrations for the lowest-magnification setting, the middle-magnification setting, and the highest-magnification setting for Example Embodiment 6; FIGS. 26(*a*), 27(*a*), and 28(*a*) are plots of spherical aberrations for the lowest-magnification setting, the middle-magnification setting, and the highest-magnification magnification setting for Example Embodiment 7; and FIGS. 30(*a*), 31(*a*), and 32(*a*) are plots of spherical aberrations for the lowest-magnification setting, the middle-magnification setting, and the highest-magnification setting for Example Embodiment 8.

FIGS. 18(b), 19(b), and 20(b) are plots of astigmatism for the lowest-magnification setting, the middle-magnification setting, and the highest-magnification setting for Example Embodiment 5. Similarly, FIGS. 22(b), 23(b), and 24(b) are plots of astigmatism for the lowest-magnification setting, the middle-magnification setting, and the highest-magnification setting for Example Embodiment 6; FIGS. 26(b), 27(b), and 28(b) are plots of astigmatism for the lowest-magnification setting, the middle-magnification setting, and the highest-magnification setting for Example Embodiment 7; and FIGS. 30(b), 31(b), and 32(b) are plots of astigmatism for the lowest-magnification setting, the middle-magnification setting, and the highest-magnification setting for Example Embodiment 8.

FIGS. 18(c), 19(c), and 20(c) are plots of distortion for the lowest-magnification setting, the middle-magnification setting, and the highest-magnification setting for Example Embodiment 5. Similarly, FIGS. 22(c), 23(c), and 24(c) are plots of distortion for the lowest-magnification setting, the middle-magnification setting, and the highest-magnification setting for Example Embodiment 6; FIGS. 26(c), 27(c), and 28(c) are plots of distortion for the lowest-magnification setting, the middle-magnification setting, and the highest-magnification setting for Example Embodiment 7; and FIGS. 30(c), 31(c), and 32(c) are plots of distortion for the lowest-magnification setting, the middle-magnification setting, arid the highest-magnification setting for Example Embodiment 8.

FIGS. 18(d), 19(d), and 20(d) are plots of lateral aberrations for the lowest-magnification setting, the middle-magnification setting, and the highest-magnification setting for Example Embodiment 5. Similarly, FIGS. 22(d), 23(d), and 24(d) are plots of lateral aberration for the lowest-magnification setting, the middle-magnification setting, and the highest-magnification setting for Example Embodiment 6; FIGS. 26(d), 27(d), and 28(d) are plots of lateral aberration for the lowest-magnification setting, the middle-magnification setting, and the highest-magnification setting for Example Embodiment 7; and FIGS. 30 (d), 31(d), and 32(d) are plots of lateral aberration for the lowest-magnification setting, the middle-magnification setting, and the highest-magnification setting for Example Embodiment 8.

FIGS. 18(e), 19(e), and 20(e) are plots of magnification chromatic aberrations for the lowest-magnification setting, the middle-magnification setting, and the highest-magnification setting for Example Embodiment 5. Similarly, FIGS. 22(e), 23(e), and 24(e) are plots of magnification chromatic aberration for the lowest-magnification setting, the middle-magnification setting, and the highest-magnification setting for Example Embodiment 6; FIGS. 26(e), 27(e), and 28(e) are plots of magnification chromatic aberration for the lowest-magnification setting, the middle-magnification setting, and the highest-magnification setting for Example Embodiment 7; and FIGS. 30(e), 31(e), and 32(e) are plots of magnification chromatic aberration for the lowest-magnification setting, the middle-magnification setting, and the highest-magnification setting for Example Embodiment 8.

In the aberration plots, H is the incident height and ω is the half-angle of the field of view. In the plots of astigmatism, solid curves represent the sagittal image plane and dashed curves represent the meridional image plane.

As is clearly seen from each aberration plot, excellent imaging performance is exhibited by each of Example Embodiments 5–8.

Whereas the invention has been described in connection with preferred and multiple example embodiments, it will be understood that the invention is not limited to those embodiments. On the contrary, the invention is intended to encompass all modifications, alternatives, and equivalents as may be included within the spirit and scope of the invention as defined by the appended claims.

What is claimed is:

1. A keplerian variable magnification viewfinder comprising, in order on an optical axis from an object side to an eyepoint side:

(a) an objective lens system and an ocular lens system;

(b) the objective lens system having overall positive refractive power and comprising first, second, third, and fourth lens groups, the first lens group having a negative focal length ($f_1$) and comprising a negative lens ($L_1$), the second lens group having a positive focal length ($f_2$) and comprising a positive lens ($L_2$) having at least one aspherical lens surface, the third lens group having a negative focal length ($f_3$) and comprising a negative lens ($L_3$), and the fourth lens group comprising a positive lens ($L_4$);

(b) the first and second lens groups being separated from each other by a first axial airspace, and the second and third lens groups being separated from each other by a second axial airspace;

(c) the fourth lens group being situated toward the eyepoint side relative to the third lens group but toward the object side relative to the ocular lens system;

(d) the ocular lens system having overall positive refractive power and permitting observation of an image, formed by the objective lens system, of an object;

(e) the first lens group being fixed on the optical axis, and the second and third lens groups being movable on the optical axis for adjusting a magnification of the viewfinder from a low-magnification end to a high-magnification end, wherein, when zooming from the low-magnification end to the high-magnification end, the first axial airspace is shortened and the second axial airspace is lengthened; and (f) the viewfinder satisfying the conditional expressions $$1.5 < (D_{12w} + D_{23w})/(D_{12t} + D_{23t}) < 3.0$$

$$2.3 < |f_3/f_2| < 3$$

$$-2.2 < \beta_{234t} < -1.2$$

wherein $D_{12w}$ is the length of the first axial airspace at the low-magnification end, $D_{23w}$ is the length of the second axial airspace at the low-magnification end, $D_{12t}$ is the length of the first axial airspace at the high-magnification end, $D_{23t}$ is the length of the second axial airspace at the high-magnification end, and $\beta_{234t}$ is a combined magnification, at the high-magnification end, of the second, third, and fourth lens groups.

2. The keplerian viewfinder of claim 1, wherein, during zooming from the low-magnification end to the high-magnification end, the second and third lens groups move toward the first lens group such that the first axial airspace is progressively shortened and the second axial airspace is progressively lengthened during such zooming.

3. The keplerian viewfinder of claim 1 wherein:

(i) the objective lens system further comprises a fourth lens group comprising a positive lens $L_4$ situated toward the eyepoint side relative to the third lens group but toward the object side relative to the ocular lens system; and (ii) the ocular lens system comprises a positive lens ($L_5$).

4. The keplerian viewfinder of claim 3, wherein the positive lens ($L_5$) comprises an aspherical surface facing the object side.

5. The keplerian viewfinder of claim 3, wherein:
   (i) the objective lens system further comprises a first reflector situated in an axial airspace between the third lens group and the fourth lens group; and
   (ii) the ocular lens system further comprises a second reflector situated toward the object side relative to the positive lens ($L_5$), the second reflector reflecting light from the objective lens system.

6. The keplerian viewfinder of claim 3, wherein the eyepoint-facing surface of the lens ($L_1$), and the object-facing surface of each of the lenses ($L_2$), ($L_4$), and ($L_5$) are aspherical.

7. The keplerian viewfinder of claim 6, wherein the eyepoint-facing surface of each of the lenses ($L_2$) and ($L_3$) is aspherical.

8. The keplerian viewfinder of claim 1, wherein, during zooming from the low-magnification end to a mid-magnification setting, the second and third lens groups move toward the first lens group such that the first axial airspace is shortened and the second axial airspace is lengthened, and during zooming from the mid-magnification setting to the high-magnification end, the second lens group continues to move closer to the first lens group but the third lens group moves away from the first and second lens groups such that the first axial airspace is further shortened and the second axial airspace is further lengthened.

9. The keplerian viewfinder of claim 8, wherein the ocular lens system comprises a positive lens group and a negative lens group situated toward the eyepoint side relative to the positive lens group.

10. The keplerian viewfinder of claim 9, wherein the positive lens group comprises a single positive lens ($L_5$) and the negative lens group comprises a single negative lens ($L_6$).

11. The keplerian viewfinder of claim 10, wherein the positive lens ($L_5$) is biconvex and the negative lens ($L_6$) is a meniscus lens having a convex surface oriented toward the object side.

12. The keplerian viewfinder of claim 1, exhibiting a zooming ratio of at least 2.

13. The keplerian viewfinder of claim 1, wherein the ocular lens comprises a positive lens ($L_5$) having a focal length ($f_5$), the viewfinder satisfying the conditional expressions:

$$-2.5 < f_3/f_5 < -0.5$$

$$0.55 < f_{123w}/f_e < 1.0$$

wherein $f_{123w}$, is a combined focal length, at the low-magnification end, of the first, second, and third lens groups, and $f_e$ is the focal length of the ocular lens system.

14. A keplerian variable magnification viewfinder comprising, in order on an optical axis from an object side to an eyepoint side:
   (a) an objective lens system and an ocular lens system;
   (b) the objective lens system having overall positive refractive power and comprising first, second, third, and fourth lens groups, the first lens group having a negative focal length ($f_1$) and comprising a negative lens ($L_1$), the second lens group having a positive focal length ($f_2$) and comprising a positive lens ($L_2$), the third lens group having a negative focal length ($f_3$) and comprising a negative lens ($L_3$), the fourth lens group comprising a positive lens ($L_4$);
   (c) the first and second lens groups being separated from each other by a first axial airspace, and the second and third lens groups being separated from each other by a second axial airspace;
   (d) the fourth lens group being situated toward the eyepoint side relative to the third lens group but toward the object side relative to the ocular lens system;
   (e) the ocular lens system having overall positive refractive power and permitting observation of an image, formed by the objective lens system, of an object, the ocular lens system comprising a positive lens group comprising a biconvex lens ($L_5$) having a focal length ($f_5$) and a negative lens group comprising a negative meniscus lens ($L_6$) having a convex surface oriented toward the object side;
   (f) the first lens group being fixed on the optical axis and the second and third lens groups being movable on the optical axis for adjusting a magnification of the viewfinder from a low-magnification end to a high-magnification end;
   (g) when zooming from the low-magnification end to a mid-magnification setting, the second and third lens groups move toward the first lens group such that the first axial airspace is shortened and the second axial airspace is lengthened, and during zooming from the mid-magnification setting to the high-magnification end, the second lens group continues to move closer to the first lens group but the third lens group moves away from the first and second lens groups such that the first axial airspace is further shortened and the second axial airspace is further lengthened;
   (h) the viewfinder satisfying the conditional expressions:

$$-2.5 < f_3/f_5 < -0.5$$

$$0.55 < f_{123w}/f_e < 1.0$$

wherein $f_{123w}$ is a combined focal length, at the low-magnification end, of the first, second, and third lens groups, and $f_e$ is the focal length of the ocular lens system.

15. The keplerian viewfinder of claim 14, wherein the lens ($L_2$) comprises an aspherical surface on each of its eyepoint-side surface and its object-side surface, the viewfinder satisfying the conditional expression:

$$0.2 < |S_2/S_1| < 0.4$$

wherein $S_1$ and $S_2$ are displacement amounts ($S(y)$), pertaining to the aspherical surface on the object side and eyepoint side, respectively, of the lens ($L_2$ along the optical axis at a height $y = |0.25r_3|$ from the optical axis, as defined by:

$$S(y) = \frac{y^2/R}{1 + \sqrt{1 - \kappa \cdot y^2/R^2}} + \sum_{n=2} C_n \cdot |y^n| - \frac{y^2/r}{1 + \sqrt{1 - y^2/r^2}}$$

wherein r is a corresponding paraxial curvature radius defined by $r = 1/(2C_2 - 1/R)$, $\nu$ is a conical constant, and $C_n$ is an nth degree aspherical surface coefficient, and $r_3$ is a paraxial curvature radius of the object-side aspherical surface of the lens ($L_2$).

16. The keplerian viewfinder of claim 14, wherein the lens ($L_1$) is biconcave and includes an aspherical surface on the eyepoint side, the viewfinder further satisfying the conditional expressions:

$$1 < \beta_{34w} < 1.4$$

$$-0.4 < (r_1+r_2)/(r_1-r_2) < 0.2$$

wherein $P_{34w}$ is the combined magnification, at the low-magnification side, of the third lens group and the fourth lens group; r, is the curvature radius of the lens surface on the object side of the lens ($L_1$), and $r_2$ is the paraxial curvature radius of the lens surface on the eyepoint side of the ($L_1$).

17. The keplerian viewfinder of claim 16, wherein:
 (i) the objective lens system further comprises a first reflector situated in an axial airspace between the third lens group and the fourth lens group; and
 (ii) the ocular lens system further comprises a second reflector situated toward the object side relative to the positive lens($L_5$), the second reflector reflecting light from the objective lens system and, together with the first reflector, serving to create an erect image of an object, from which light passes through the objective and ocular lens systems, as viewed by a user.

18. The keplerian viewfinder of claim 14, wherein the eyepoint-facing surface of the lens ($L_1$) and the object-facing surface of each of the lenses ($L_2$), ($L_4$), and ($L_5$) are aspherical.

19. The keplerian viewfinder of claim 18, wherein the eyepoint-facing surface of the lens ($L_2$) is aspherical.

20. The keplerian viewfinder of claim 14, wherein at least one lens surface of the positive lens $L_2$ is an aspherical surface, the viewfinder satisfying the conditional expression:

$$2.3 < f_3/f_2 < 3$$

21. The keplerian viewfinder of claim 20, satisfying the conditional expression:

$$-2.2 < \beta_{234t} < -1.2$$

wherein $\beta_{234t}$ is a combined magnification, at the high-magnification end, of the second, third, and fourth lens groups.

* * * * *

UNITED STATES PATENT AND TRADEMARK OFFICE
CERTIFICATE OF CORRECTION

PATENT NO. : 5,956,178

DATED : September 21, 1999

INVENTOR(S) : Akiko Furuta

It is certified that error appears in the above-identified patent and that said Letters Patent is hereby corrected as shown below:

Column 2, line 50, "$1.5 < (D_{12w} + D_{23w})/(D_{12t} + D_{23t}) > 3.0$" should be --$1.5 < (D_{12w} + D_{23w})/(D_{12t} + D_{23t}) < 3.0$--.

Column 2, line 51, "$D_{12}w$ and $D_{23}w$" should be --$D_{12w}$ and $D_{23w}$--.

Column 4, line 17, "at:" should be --at--.

Column 4, line 66, "slots" should be --plots--.

Column 7, line 23, "lens move" should be --lens groups move--.

Column 8, line 50, "$1.5 < (D_{12} + D_{23w})/(D_{12t} + D_{23t}) < 3.0$" should be --$1.5 < (D_{12w} + D_{23w})/(D_{12t} + D_{23t}) < 3.0$--.

Column 8, line 53, "$D_{23}w$" should be --$D_{23w}$--.

Column 9, line 5, "masking" should be --making--.

Column 9, line 37, "$-2.2 < \beta_{2347} < -1.2$" should be -- $-2.2 < \beta_{234t} < -1.2$ --.

Column 9, line 57, "be" should be --is--.

Column 10, line 49, "cancels cancel" should be --cancels--.

UNITED STATES PATENT AND TRADEMARK OFFICE
CERTIFICATE OF CORRECTION

PATENT NO.  : 5,956,178

DATED       : September 21, 1999

INVENTOR(S) : Akiko Furuta

It is certified that error appears in the above-identified patent and that said Letters Patent is hereby corrected as shown below:

Column 11, line 6, "lens L2" should be --lens $L_2$--.

Column 12, line 54, the open parenthesis ")" should be deleted.

Column 12, line 64, " "2H" " should be -- "2H'" --.

Column 16, line 14, Table 4, in the second line of data under the heading "Aspherical Surface Data" (specification page 37, line 5), "$C_{8 = -7.39010 \times 10}{}^{-7}$" should be --$C_8 = -7.39010 \times 10^{-7}$--.

Column 16, line 16, Table 4, in the fourth line of data under the heading "Aspherical Surface Data", "$C_{4 = 3.01460 \times 10}{}^{-5}$" should be --$C_4 = 3.01460 \times 10^{-5}$--.

Column 21, line 63, Table 9, an asterisk --*-- should be added after "4" in the first column (labeled "Surface No.").

Column 22, line 23, Table 9, in the tenth line of data under the heading "Aspherical Surface Data", "$c_{10} = 1.10500 \times 10^{-06}$" should be --$c_{10} = 1.10500 \times 10^{-6}$--.

Column 22, line 24, Table 9, in the thirteenth line of data under the heading "Aspherical Surface Data", "$c_8 = -5.15100 \times 10\text{-}8$" should be --$c_8 = -5.15100 \times 10^{-8}$--.

Column 22, line 45, Table 10, in the fourth line of data, "1(2)" should be --(2)--.

Column 22, line 55, the second occurrence of "19(a)" should be --20(a)--.

UNITED STATES PATENT AND TRADEMARK OFFICE
CERTIFICATE OF CORRECTION

PATENT NO. : 5,956,178
DATED : September 21, 1999
INVENTOR(S) : Akiko Furuta

It is certified that error appears in the above-identified patent and that said Letters Patent is hereby corrected as shown below:

In the Claims:

Column 24, line 23, claim 1, "(b)" should be --(c)--.

Column 24, line 27, claim 1, "(c)" should be --(d)--.

Column 24, line 31, claim 1, "(d)" should be --(e)--.

Column 24, line 34, claim 1, "(e)" should be --(f)--.

Column 24, line 42, claim 1, "(f)" should be --(g)--.

Column 24, line 62, through column 25, line 1, claim 3, all the text beginning with the colon ":" on line 62 of column 24, through "(ii)" on line 1 of column 25, should be deleted, so that claim 3 reads as follows:

--3. The keplerian viewfinder of claim 1 wherein the ocular lens system comprises a positive lens ($L_5$).--

Column 25, line 54, claim 13, the comma "," after --$f_{123w}$-- should be deleted.

Column 26, line 47, claim 15, "$0.2 < |S_2/S_1 < 0.4$" should be --$0.2 < |S_2/S_1| < 0.4$--.

Column 26, line 51, claim 15, "($L_2$" should be --($L_2$)--.

Column 26, line 60, claim 15, "$\upsilon$" should be --$\kappa$--.

UNITED STATES PATENT AND TRADEMARK OFFICE
CERTIFICATE OF CORRECTION

PATENT NO. : 5,956,178

DATED : September 21, 1999

INVENTOR(S) : Akiko Furuta

It is certified that error appears in the above-identified patent and that said Letters Patent is hereby corrected as shown below:

Column 27, line 3, claim 16, "$P_{34w}$" should be --$\beta_{34w}$--.

Column 27, line 5, claim 16, "r," should be --$r_1$--.

Column 28, line 4, claim 20, "$L_2$" should be --$(L_2)$--.

Column 28, line 7, claim 20, "$2.3 < f_3/f_2 < 3$" should be --$2.3 < |f_3/f_2| < 3$--.

Signed and Sealed this

Twenty-ninth Day of May, 2001

Attest:

NICHOLAS P. GODICI

Attesting Officer

Acting Director of the United States Patent and Trademark Office